United States Patent
Gray et al.

(10) Patent No.: US 7,912,701 B1
(45) Date of Patent: Mar. 22, 2011

(54) METHOD AND APPARATUS FOR SEMIOTIC CORRELATION

(75) Inventors: Wayne Randal Gray, Sunnyvale, CA (US); Radhika Suryakant Shah, Palo Alto, CA (US)

(73) Assignee: IgniteIP Capital IA Special Management LLC, Wilmington, DE (US)

( * ) Notice: Subject to any disclaimer, the term of this patent is extended or adjusted under 35 U.S.C. 154(b) by 991 days.

(21) Appl. No.: 11/744,795

(22) Filed: May 4, 2007

Related U.S. Application Data

(63) Continuation-in-part of application No. 11/429,466, filed on May 4, 2006, now abandoned, which is a continuation-in-part of application No. 11/429,456, filed on May 4, 2006, now abandoned, which is a continuation-in-part of application No. 11/429,394, filed on May 4, 2006, now abandoned.

(60) Provisional application No. 60/916,191, filed on May 4, 2007, provisional application No. 60/798,160, filed on May 4, 2006, provisional application No. 60/678,593, filed on May 4, 2005, provisional application No. 60/678,040, filed on May 4, 2005.

(51) Int. Cl.
 *G06F 17/27* (2006.01)
(52) U.S. Cl. .................................. 704/9; 704/7; 704/257
(58) Field of Classification Search .................. 704/1, 3, 704/4, 7, 9, 10, 257; 715/236; 707/501, 707/3, 4
 See application file for complete search history.

(56) References Cited

U.S. PATENT DOCUMENTS

| 5,095,432 | A | | 3/1992 | Reed |
| 5,794,210 | A | | 8/1998 | Goldhaber et al. |
| 5,799,184 | A | | 8/1998 | Fulton et al. |
| 5,887,120 | A | | 3/1999 | Wical |
| 5,918,236 | A | | 6/1999 | Wical |
| 5,940,821 | A | | 8/1999 | Wical |
| 5,963,965 | A | * | 10/1999 | Vogel ............................ 715/236 |
| 6,014,638 | A | | 1/2000 | Burge et al. |
| 6,038,560 | A | | 3/2000 | Wical |
| 6,078,914 | A | | 6/2000 | Redfern |
| 6,199,034 | B1 | | 3/2001 | Wical |
| 6,236,987 | B1 | | 5/2001 | Horowitz et al. |
| 6,240,410 | B1 | | 5/2001 | Wical |
| 6,275,817 | B1 | | 8/2001 | Reed et al. |
| 6,356,921 | B1 | | 3/2002 | Kumar et al. |
| 6,363,378 | B1 | | 3/2002 | Conklin et al. |
| 6,460,034 | B1 | | 10/2002 | Wical |
| 6,567,805 | B1 | | 5/2003 | Johnson et al. |
| 6,584,470 | B2 | | 6/2003 | Veale |

(Continued)

OTHER PUBLICATIONS

U.S. Appl. No. 12/268,373, filed Nov. 10, 2008, Wayne et al.

(Continued)

*Primary Examiner* — Huyen X. Vo
(74) *Attorney, Agent, or Firm* — Kilpatrick Townsend & Stockton LLP

(57) ABSTRACT

A method for a computer system includes receiving an input source comprising a plurality of sentences, determining a set of semiotic relationships from the plurality of sentences, performing a contextual correlation in response to the set of semiotic relationships and in response to an ideas index to determine a reduced set of semiotic relationships from the set of semiotic relationships, omparing the reduced set of semiotic relationships to each of a plurality of semiotic relationships associated with a set of documents to determine comparison values, determining a reduced set of documents from the set of documents in response to the comparison values, and outputting portions of the reduced set of documents to a user.

Thematic Index Development / Data Discovery Embodiments

20 Claims, 30 Drawing Sheets

U.S. PATENT DOCUMENTS

| | | |
|---|---|---|
| 6,622,123 B1 | 9/2003 | Chanod et al. |
| 6,778,975 B1 | 8/2004 | Anick et al. |
| 6,826,559 B1 | 11/2004 | Ponte |
| 6,834,280 B2 | 12/2004 | Auspitz et al. |
| 6,961,954 B1 | 11/2005 | Maybury et al. |
| 6,978,264 B2 | 12/2005 | Chandrasekar et al. |
| 7,043,094 B2 | 5/2006 | Thomas et al. |
| 7,047,242 B1 | 5/2006 | Ponte |
| 7,162,508 B2 | 1/2007 | Messina |
| 7,249,117 B2 | 7/2007 | Estes |
| 7,305,336 B2 | 12/2007 | Polanyi et al. |
| 7,424,476 B2 | 9/2008 | Apparao et al. |
| 7,526,425 B2 | 4/2009 | Marchisio et al. |
| 2001/0037328 A1 | 11/2001 | Pustejovsky et al. |
| 2001/0056434 A1 | 12/2001 | Kaplan et al. |
| 2002/0108112 A1 | 8/2002 | Wallace et al. |
| 2002/0111786 A1 | 8/2002 | Sugeno et al. |
| 2002/0188586 A1 | 12/2002 | Veale |
| 2002/0198871 A1 | 12/2002 | Auspitz et al. |
| 2002/0198909 A1 | 12/2002 | Huynh et al. |
| 2003/0009377 A1 | 1/2003 | Asami et al. |
| 2003/0028564 A1 | 2/2003 | Sanfilippo |
| 2003/0110181 A1 | 6/2003 | Schuetze et al. |
| 2003/0113017 A1 | 6/2003 | Thomas et al. |
| 2003/0115191 A1 | 6/2003 | Copperman et al. |
| 2003/0126136 A1 | 7/2003 | Omoigui |
| 2003/0137536 A1 | 7/2003 | Hugh |
| 2004/0073550 A1 | 4/2004 | Meirovitz et al. |
| 2004/0098451 A1 | 5/2004 | Mayo |
| 2004/0098467 A1 | 5/2004 | Dewey et al. |
| 2004/0119759 A1 | 6/2004 | Barros et al. |
| 2004/0205659 A1 | 10/2004 | Barry et al. |
| 2004/0230572 A1 | 11/2004 | Omoigui |
| 2004/0249709 A1 | 12/2004 | Donovan et al. |
| 2004/0267729 A1 | 12/2004 | Swaminathan et al. |
| 2005/0071150 A1 | 3/2005 | Nasypny |
| 2005/0108001 A1 | 5/2005 | Aarskog |
| 2005/0138109 A1 | 6/2005 | Redlich et al. |
| 2005/0144158 A1 | 6/2005 | Capper et al. |
| 2005/0154690 A1 | 7/2005 | Nitta et al. |
| 2005/0160107 A1 | 7/2005 | Liang |
| 2005/0209983 A1 | 9/2005 | MacPherson |
| 2005/0288976 A1 | 12/2005 | Abrams et al. |
| 2006/0026147 A1 | 2/2006 | Cone et al. |
| 2006/0053382 A1 | 3/2006 | Gardner et al. |
| 2006/0080272 A1 | 4/2006 | Juan et al. |
| 2006/0106784 A1 | 5/2006 | Alpha |
| 2007/0100915 A1 | 5/2007 | Rose et al. |
| 2008/0147788 A1 | 6/2008 | Omoigui |

OTHER PUBLICATIONS

U.S. Appl. No. 11/744,808, filed May 4, 2006, Wayne et al.
U.S. Appl. No. 11/744,794, filed May 4, 2006, Wayne et al.
U.S. Appl. No. 11/429,466, filed May 4, 2006, Wayne et al.
U.S. Appl. No. 11/429,456, filed May 4, 2006, Wayne et al.
U.S. Appl. No. 11/429,394, filed May 4, 2006, Wayne et al.
Weglarz, "Two Worlds of Data—Unstructured and Structured," Information Management Magazine, Sep. 1, 2004, pp. 1-5.
Non-Final Office Action for U.S. Appl. No. 11/429,456, mailed on Mar. 2, 2009, 10 pages.
Final Office Action for U.S. Appl. No. 11/429,456, mailed on Nov. 6, 2009, 12 pages.
Non-Final Office Action for U.S. Appl. No. 11/429,394, mailed on Dec. 24, 2008, 10 pages.
Final Office Action for U.S. Appl. No. 11/429,394, mailed on Oct. 8, 2009, 11 pages.
Non-Final Office Action for U.S. Appl. No. 11/429,466, mailed on Feb. 26, 2009, 12 pages.
Final Office Action for U.S. Appl. No. 11/429,466, mailed on Nov. 5, 2009, 15 pages.
Non-Final Office Action for U.S. Appl. No. 11/744,794, mailed on Mar. 4, 2010, 7 pages.
Non-Final Office Action for U.S. Appl. No. 11/744,808, mailed on May 12, 2009, 9 pages.
Final Office Action for U.S. Appl. No. 11/744,808, mailed on Nov. 25, 2009, 10 pages.
Final Office Action for U.S. Appl. No. 11/744,794, mailed on Sep. 28, 2010, 17 pages.

* cited by examiner

How to Be a Good Leader Prioritized Themes
- Leadership Success
- Leader as Coach
- Shared Vision
- What Leaders Really Do
- More works by Jack Welch
- Leadership stories
- Management styles
- Mentorship
- Leadership seminars
- ...

How to Be a Good Leader Prioritized Themes
- Leadership Success
- Leader as Coach
- Shared Vision
- What Leaders Really Do
- More works by Jack Welch
- Leadership stories
- Management styles
- Mentorship
- Leadership seminars
- ...

How to Be a Good Leader Prioritized Themes
- Shared Vision
- What Leaders Really Do
- Leadership Success
- Leader as Coach
- More works by Jack Welch
- Leadership stories
- Management styles
- Mentorship
- Leadership seminars
- ...

How to Be a Good Leader Prioritized Themes
- Leadership Success
- Leader as Coach
- Shared Vision
- What Leaders Really Do
- More works by Jack Welch
- Leadership stories
- Management styles
- Mentorship
- Leadership seminars
- ...

How to Be a Good Leader Prioritized Themes
- Leadership Success
- Leader as Coach
- Shared Vision
- What Leaders Really Do
- More works by Jack Welch
- Leadership stories
- Management styles
- Mentorship
- Leadership seminars
- ...

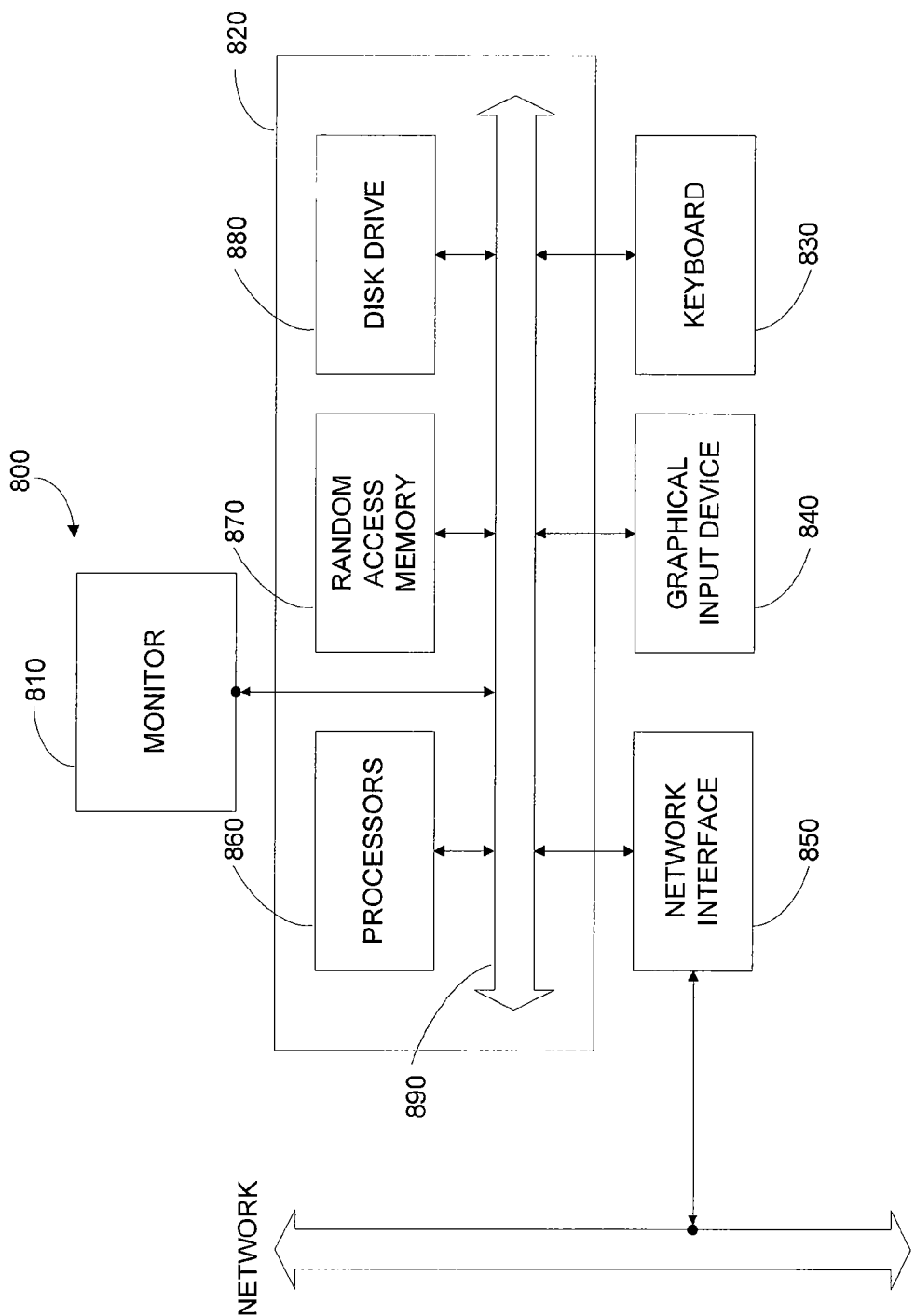

Thematic Query Refinement

- Topic / Idea Selection
- Encyclopedic drill down
- More like this "Thumbs Up"

Keywords taken individually or simply strung together are ambiguous

Potential meanings of a phrase goes unrecognized

Note: Random word combinations become nonsensical

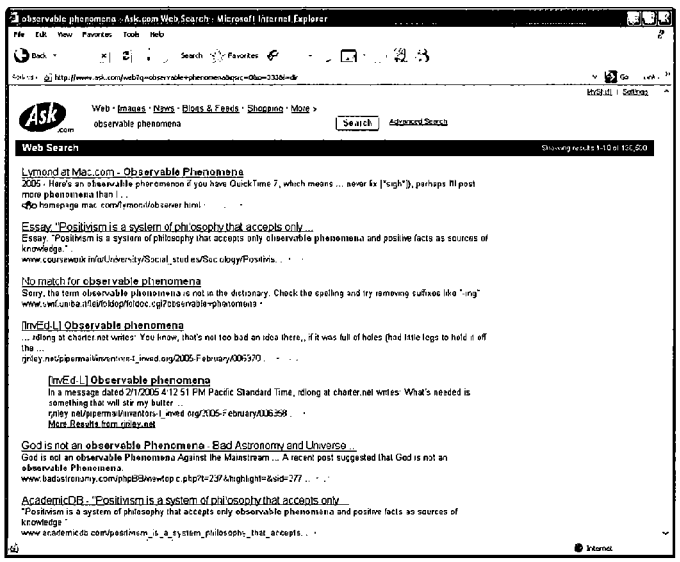

Keywords taken individually or simply strung together are ambiguous

Potential meanings of a phrase goes unrecognized

Note: Even though the words are found in sequence, their meaning is lost

FIG. 22B

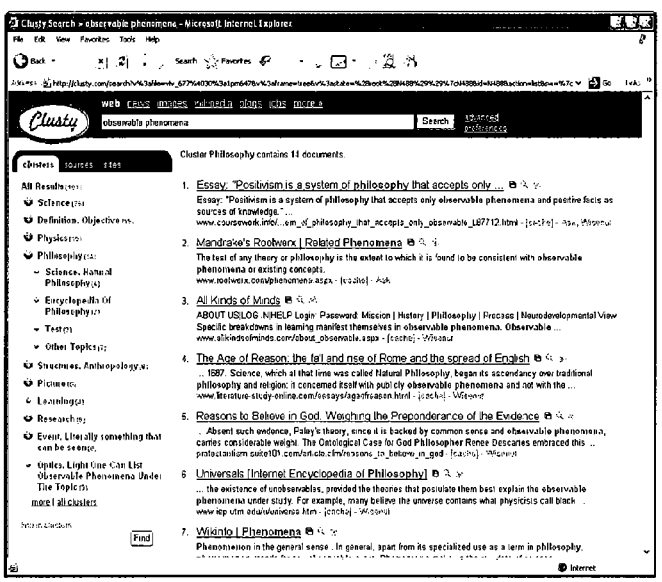

Keywords taken individually or simply strung together are ambiguous

Potential meanings of a phrase goes unrecognized

Note: Even after manually selecting the Philosophy Cluster, still only the words are found in sequence and their meaning is lost

FIG. 22C

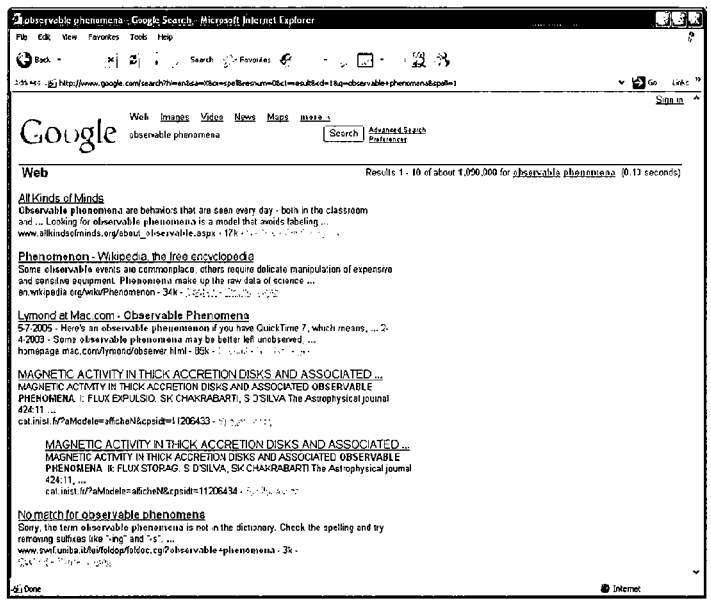

Keywords taken individually or simply strung together are ambiguous

Potential meanings of a phrase goes unrecognized

Note: Even though the words are found in sequence, their meaning is lost

FIG. 22D

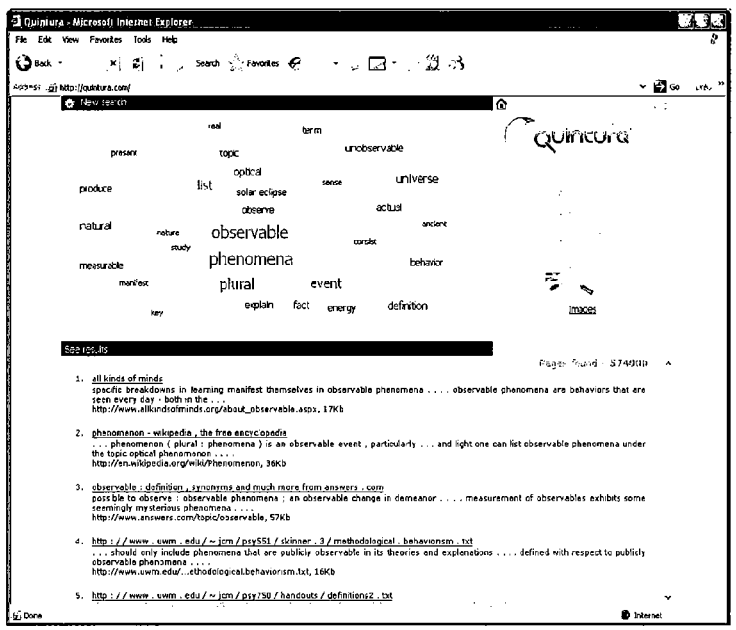

Keywords taken individually or simply strung together are ambiguous

Potential meanings of a phrase goes unrecognized

Note: Only synonyms of the individual words are found – results become nonsensical (*plural, definition, list, manifest, etc.*)

FIG. 22E

Virtual Synaptics

Interpreting Grammar

Extracts potential meanings from a phrase

Potential meanings are automatically categorized – best matches are auto-selected

METHOD AND APPARATUS FOR SEMIOTIC CORRELATION

CROSS-REFERENCES TO RELATED APPLICATIONS

The present application is a nonprovisional application of U.S. Provisional Application Nos. 60/798,160 filed May 4, 2006 and 60/916,191 filed May 4, 2007, and is a continuation-in-part of U.S. patent application Ser. Nos. 11/429,456, 11/429,394, and 11/429,466 all filed on May 4, 2006, which are nonprovisional applications of U.S. Provisional Application Nos. 60/678,593 and 60/678,040 filed on May 4, 2005, and 60/798,160 filed on May 4, 2006. These disclosures are hereby incorporated by reference in their entirety for all purposes.

BACKGROUND OF THE INVENTION

The present invention relates generally to processing techniques of one or more objects from one or more information sources. More particularly, the present invention provides methods and systems for processing information using a thematic based technique, including processes, systems, and user interfaces to perform, for example, web searching. Merely by way of example, the invention has been applied to searching web sites, but it would be recognized that the invention has a much broader range of applicability. The invention can be applied to searching web sites, information associated with URLs, data sources resident on a local computer system or network storage system, intranets, patent documents (e.g., patents, publications), electronic archives, online-journals, blogs, news articles, any natural language based (electronic) information available in electronic format (textual), electronic messages, any combination of these, and the like.

The amount of electronically produced and stored information has exploded over the years with the proliferation of computers, information devices (e.g. PDAs, cell phones), computer networks, storage devices, shopping, security/privacy databases, and the like. Such electronic information includes, among others, on-line newspapers, magazines, advertisements, web sites, blogs, user forums, commercial publications, commercial databases, as well as electronic information generated by individuals and organizations, such as e-mail messages, transactional information/security, word processing documents, presentation documents, spreadsheet documents, and the like. By way of a world wide network of computers, such as the Internet, billions of pieces of information are now available through operating-system neutral "browser" programs such as Internet Explorer by Microsoft, Firefox by the Mozilla Foundation, Navigator by Netscape, or the like.

As the amount of information continually increases, a user's ability to access specific and targeted information becomes more important. Information retrieval engines such as those made by Yahoo! Corporation, Google, Microsoft, and others present information sources to a user primarily by using a key-word indexing technique. These indexing techniques often rely upon performing a full or partial text indexing of data sources, noting which key words are used more frequently, and associating those key words to the data sources. Yet other techniques, which use associations to a selected website, include those provided by Google Inc. and information stored in meta-data, link, references, etc.

As noted above and further emphasized, conventional techniques are often based on syntactic or lexical analysis; utilizing various techniques to relate information on keywords. Keyword searching, however, is generally ineffective due to the use of multiple terms and varying grammatical structures representing the same concepts in different documents. Keyword searching, is also generally ineffective because the same words and grammatical structures may represent many different concepts, as distinguished only by the greater context of the discourse. The result is poor precision (unsatisfactorily high levels of incorrect or irrelevant results (false positives)) and poor recall (are numbers of missed (false negative) associations). In addition, these systems cannot relate information to a task and are thus limited to providing lists ranked on some non-task related means (such as anchors, links, number of references, number of hits, advertising dollars, etc.—see link analysis systems; i.e. PageRank, HITS, etc.). This limitation reduces current solutions to offering tools for assisting in various steps in a business process, a consumer task, or the like and cannot enable the automation of those steps or offer assistance in completing a task from start-to-finish.

Full text index searching has been another way to retrieve information in conventional retrieval engines. Unfortunately, such full text searching is plagued with many problems. For example, a user of such searching often retrieves thousands of documents or hits for related documents which simply contain one or more of the keywords somewhere in their content. Since the mere inclusion of the keyword in a discourse provides very limited insight into the subject matter, purpose, and a focus of the discourse, the results of the search are therefore not precise. Such searching often requires refinement using a hit or miss strategy, which is often cumbersome and takes time and lacks efficiency. Despite best efforts of users or ranking systems, it may be impossible to identify a set of keywords that locates the best and most related material and/or effectively rank those results without any semantic level understanding or any user interest based ranking. Accordingly, full text searching has much room for improvement.

Natural language techniques are examples of other attempts for searching large quantities of information. Such natural language techniques often use simple logical forms, pattern match systems, ontologies and/or rule based systems which are difficult to scale efficiently and lack precision using large quantities of information. For example, conventional natural language techniques often cause what is known as "combinatorial explosion" when the number of logical forms that are stored as templates grows. Adding to their complexity, they typically require a very high degree of accuracy in order to provide any useful results. For example, speech-to text conversion often employs NLP techniques and, due to the amount of nonsensical output, is generally considered unusable with accuracies below 98%. Accordingly, natural language techniques have not been able to be scale for large complex information systems. Additionally, the inventors recognize that words in any language have meanings that are very context sensitive and written communication is governed by very loose rules of grammar.

In general, various approaches have been attempted to automatically extract human level understanding from digital content, almost all have involved an a priori approach. The systems are based on building a model of human understanding ahead of time and then some form of pattern matching between the model and the data are performed. This is typically done by building some form of ontology; for example, a set of rules that model human behavior or some form of taxonomy to organize information based on a pre-set categorization system. However, this approach has proven to be unscalable and, at best, beyond the limits of the capabilities and scope of our current technology. A fundamental problem with ontologies is that they try to capture "truths." Such inferences of "truth" are defined and established through reference to the conventions associated with a particular semiotic system in which concepts/truths are represented. More importantly, they may exist and be valid only in the context of a particular representation. In other words, a "truth" may be temporal and exist only for the concept in which it is represented. Thus, any a priori ontology of truth, while valid for some concept, may be invalid for another; thereby making the ontology impossible to predefine.

Beyond their form of implementation, expert systems, taxonomies, etc., ontological rules can be based on any of several different approaches ranging from emulating human cognition to defining formal processes for interpreting grammar. Systems that rely on accurately interpreting grammar suffer from the imperfections in natural languages that tend to cloud rather than disclose the thoughts with they expose. The clouding of thought resulting from the non-formal nature of natural languages makes it difficult for humans to communicate effectively. Thus, it is difficult to accurately infer consistent interpretations of concepts conveyed in discourses. Since the current state of artificial intelligence is far more primitive than even the most basic human capability and, since grammatical interpretation taxes the most advanced human cognitive abilities, any system that relies on interpreting grammar is likely decades and several orders of magnitude of technological advancements away from success. This indicates to the inventors that any practical system must avoid creating a solution that requires capturing the essence of how the individual mind grasps the meanings of the linguistic expressions and acquires linguistic competence. It is by no means obvious how a mental entity such as an idea can be determined.

Additionally, the inventors of the present invention understand that the gap between the generation of information and the knowledge gained/extracted is further widening. Most data is unclassified and unstructured, making it unsuitable for current data management technology solutions such as traditional data mining and OLAP. While conventional search and categorization technologies can process unstructured data and, given keywords or phrases, identify lists of documents referencing those phrases or build basic taxonomies based on statistical clustering of keywords or phrases, they are ineffective in complex information extraction and analysis. The conventional technologies are based on the assumption that there are naturally occurring groups of words or phrases that can be identified by users and that are more commonly referred to in documents containing related themes than in other unrelated material. Due to the nature of language itself, this is generally not a valid assumption and thus the relationships identified by search systems are often misguided. Further, attempts to categorize search results through automated clustering tends to produce taxonomies with mathematical relations that often have no natural interpretation and limited practical use. More importantly, however, many if not all of these conventional systems put the burden of analysis on the user to wade through possibly irrelevant results. Thus, with conventional technology, the only effective way for users to achieve a task, such as preparing a legal brief from diverse information sources and multiple formats, is manually. The manual process is slow, expensive, error prone, and does not scale.

Other approaches to the problem, that do not rely on predefined ontologies include latent semantic analysis (LSA). This process does involve semantics, but focuses primarily on counting frequencies of keywords. Drawbacks to such an analysis is that without any semantic knowledge is impossible to perform any type of analysis beyond simple relationship establishment based on word frequency counting. As evident by the industry's standardization on inverted list keyword indexing systems (such as Google, Yahoo!, MSN, Amazon, etc.), in most practical applications the advantages of LSA have proven to be marginal. Additionally, LSA is inherently more complex than keyword indexing systems. LSA is currently used in determining the similarity of meaning of words and passages by analysis of large bodies of text rather than higher level cognitive analysis.

As with many systems based on simplification of idealized systems, controlled experimental results of LSA do not accurately reflect the results of real-world applications. Specifically LSA's strength, its lack of need for knowledge from perceptual information about the physical world, from instinct, or from experimental intercourse, feelings, or intentions, also limits its success in practical applications. Because LSA induces it's representation of the meaning of words and passages solely from analysis of text alone, it is incapable of identifying related concepts in a generalized case. This results from the fact that grammatical representations of similar expressions of thoughts can vary dramatically, making it impossible to identify a single set of words which will be use consistently to express the same thought in any given context.

As can be seen from the above, techniques for improving searching of information are highly desirable.

BRIEF SUMMARY OF THE INVENTION

According to the present invention, techniques related generally to processing techniques of one or more objects from one or more information sources are provided. More particularly, the present invention provides methods and systems for processing information using a thematic based technique, including processes and systems, to perform, for example, web searching.

Various embodiments of the present invention allow users to find and gather information on whatever topic they are interested in. Some embodiments include processes including using input "documents" such as: user input text (search terms or prose), webpage URLs, textual documents, closed captioning text, other structured or unstructured data sources, and the like as input to a system. Based upon such input, a number of themes are extracted.

In various embodiments, based upon the derived themes of the input, themes that match the derived themes are returned to the user. "Documents" that are characterized by the matched theme may also be returned to the users, as a summary. In various embodiments, the results can be displayed organized in different ways, e.g., as an ordered list (table) of individual found documents (like results in most search engines), by common topics extracted from the result-items, or the like. Additionally, sponsorship materials may be presented to a user, based upon themes.

In various embodiments, the results may also be refined based upon user feedback. In other words, the user may select a first group of matched themes as being more relevant and a second group of matched themes as being less relevant. In response, the ordering of the matched themes and documents returned to the user may be modified.

In various embodiments, the user may be guided. This may include guiding the user for vertical solution applications, for topic-specific applications (e.g., business travel) and for consumer-specific applications, as will be described below. These guide users through the steps of conducting a search, and provide topic-specific results-displays and analyses.

In light of the present application disclosure, one will recognized that the invention has a broad range of applicability such as in: security systems, privacy and confidentiality systems, auto-response systems, consumer systems, and the like. Further embodiments may also include extracting or starting humanlike understanding of the expressions of thought contained within the text, and applying that "knowledge" to specific tasks, such as web and file searching automated response, privacy and confidentiality associative monitoring, security, topic summarization, information associated with URLs, patent documents (e.g., patents, publications), electronic messages, any combination of these, and the like.

In some embodiments, the present invention provides a method for creating a thematic index from one or more information sources, e.g., web sites, documents. The method includes providing (e.g., web crawler) one or more objects, e.g., web pages. The method also includes processing the one or more objects to derive one or more respective concepts from respective one or more objects and deriving at least one theme associated with the one or more concepts, which is derived from the one or more respective objects. The method includes storing information associated with the theme into one or more memories to build a portion of knowledge base for a thematic index. The thematic index operating in a manner similar to how humans remember basic concepts when reading a discourse and can be used for high speed search and look up processes.

In other embodiments, the present invention provides a system for creating a thematic index from one or more information sources. The system has one or more memories. The one or more memories include one or more codes directed to providing one or more objects and one or more codes directed to processing the one or more objects to derive one or more respective concepts from respective one or more objects. The system also has one or more codes directed to deriving at least one theme associated with the one or more concepts that is derived from the one or more respective objects. The one or more codes is directed to storing information associated with the theme into one or more memories to build a portion of knowledge base for a thematic index.

Many benefits are achieved by way of the present invention over conventional techniques. For example, the present technique provides an easy to use process that can be readily built upon existing technologies. Depending upon the embodiment, one or more of these benefits may be achieved. These and other benefits will be described in more detail throughout the present specification and more particularly below.

In an additional specific embodiment, the present invention provides methods and systems for providing unstructured data analysis. The methods and systems can be adapted to provide intelligent solutions for vertical applications, such as e-Business/e-Government portals, and desktop search and analytic solutions. Additionally, the present methods and systems, according to specific embodiments, provide for specific vertical and horizontal applications, such as business intelligence and strategy development, competitive analysis, intellectual property analysis, help portals, and consumer focused offerings. One example of a horizontal application may be a consumer end-user search application that uses thematic analysis, discussed further below, to help the end-user identify relevant data on a user desktop, a network drive, the Internet, or the like. Depending upon the embodiment, in addition VARs and partners can build stand-alone applications based on the present analytics platform and methods to address the needs of specific markets.

In various embodiments, the present methods and systems extract and correlate themes (meaning) rather than syntax. Additionally, such embodiments produce interactive assessments that bring intelligent capabilities to solutions such as evolving of word processing to knowledge processing, and provide a user experience that attempts to seamlessly blend the ability of computer networks to collect and process data with the power of human judgment. In some embodiments, the present system and methods include storage and processing strengths of computers to provide intelligent knowledge extraction and automation of the manual and labor intensive processes that is a part of completing many common business, consumer functions, or consumer tasks.

Depending upon the embodiment, the present methods and systems are adapted in unstructured analytics to correlate information thematically; breaking the intractabilities in natural language processing (NLP) into a numeric problem from which task specific assessments can be automatically generated. In various embodiments, the present methods and systems can apply task specific statistical inference to assist users in both forming opinions and producing the final output (reports, documents, list of links, etc.) often required to meet specific business needs; thereby advancing the state-of-the-art from simple tools to point-and-click automation of the steps from blank document to final result. Unlike conventional analytics systems that help users with generating predictive models and with certain target variable prediction related decisions, this present approach helps the user achieve a specific business function by generating assessments that enable end-to-end task completion according to some embodiments.

In other embodiments, the present invention provides methods and systems in the form of end-to-end web based application services that allow subscribing users to access specific applications via a plurality of Virtual Assistants. In some embodiments, the Virtual Assistants can be accessed as a web-based service or seamlessly invoked while accomplishing specific task within applications, such as the Microsoft Office™ Suite developed by Microsoft Corporation of Redmond, Wash. Once tasked, the software based virtual assistants autonomously complete research and analysis activity, offer hypotheses and assessments, and interactively and securely transfer knowledge to the user to assist the user in completing specific business intelligence needs. Virtual assistants can be chosen based on required task specific capabilities or from general domains where their knowledge bases are most applicable according to some embodiments.

In various embodiments, functionality may depend upon requirements of the user. For example Consumer-level applications (e.g. search results, shopping results) may have simplified interfaces, Professional/Expert-level applications (e.g. IP Law, medicine) may include more specialized functionality, and other applications (e.g. Information retrieval) may include additional flexibility in displaying or refining thematic results.

For example, a biotech firm may wish to evaluate a technology licensing opportunity. This firm could task a general IP or specific biopharmaceutical virtual assistant to review the company's pending patents, identify related activity and prior art, and provide an interactive assessment to assist the user in forming opinions such as patentability, freedom-to-operate, validity, and infringement potential. In addition, the user can task a virtual assistant to survey and analyze the competitive landscape to determine the scope of the venture's competitive advantage, identify and research potential business partners including current products and activities in related areas, development projects, types of licensing agreements and business associations, and perform contract analysis to identify impeding obligations and liabilities. The user can then interact with the assessments to tailor an opinion and redirect the virtual assistant in new directions based on the resulting transfer of knowledge. Finally, the user can request that the virtual assistant "remain on the job" and continuously repeat the research and analysis tasks to identify and report new developments with updated assessments over time.

In some embodiments, the invention provides methods and systems for a general purpose analytics engine and open platform as well as end-to-end solutions in certain key areas similar to that of database platform providers, such as Oracle Corporation and IBM Corporation. Where these vendors provide (1) a database engine, such as SQL, (2) structural schemas, and (3) data repositories. Embodiments of the present invention provide an (1) analytics engine, (2) knowledge schemas, and (3) extensible knowledge repositories according to some embodiments. As with database platform providers, the present methods and analytics platform provide an ability, through software development tools and language interfaces to construct a wide range of solutions. Where database engines are used to make queries against structured data, the present analytics engine can be used to locate task relevant information from disparate content sources and data repositories such as the World Wide Web, premium content providers, corporate intranet servers, desktop data, etc.

In some embodiments, the present invention provides a method and system that uses a combination of advanced analytics and correlation technology that can be combined with domain-specific human expertise to facilitate interactive knowledge transfer for specific tasks or business needs. This is done in a secure manner to ensure the confidentiality of the information and evaluations. A solution is based on the company's proprietary general purpose analytics engine that provides universal unstructured information identification and extraction capabilities via a unique technique named thematic correlation.

The extraction of themes is a unique approach of various embodiments of the present invention. Themes may be defined as meaningfully related groups of basic-units or semantic data. Once the themes have been extracted, the themes are correlated based on meaning rather than existing techniques of parsing syntax or basic entities such as people and events. Additionally, instead of traditional data mining techniques, morphological inference may be used to infer the document structure in cases where such structure exists and is relevant for the task at hand.

In some embodiments, the thematic correlation technique is augmented with a bi-directional knowledge transfer involving the user in guiding/directing the system and learning from it. This guided search and analytics—during which the user explicitly and implicitly helps the system narrow down and focus on a specific task based on the user's need by indicating 'more like this' and 'less like that'—is a process innovation that is uniquely differentiated from the current page-ranking systems used by search engines.

Additionally, domain instantiations provide templates, possible in the form of exposed APIs and/or SDKs for tailoring the analytics engine to perform specific vertical market tasks. Vendors that build applications on top of the present platform can also add light-weight application logic and templates for specific tasks.

Still further, the present invention can be applied to certain applications. As merely an example, such applications include basic research and analysis tasks, such as "Intellectual Property (IP) Analysis", and will offer task specific and premium/value-added solutions to multiple verticals within that area in an opportunistic manner. For example, the present patent analysis process requires a large amount of manual document collection and manual analysis. This makes the process expensive, time-consuming, and error-prone. Additionally, the recursive nature of searching creates an exponential growth in search results as drilling into and analyzing each result typically exposes new sets of references. This makes it difficult or impossible to manually collect and analyze more than a cursory portion of related material in a reasonable time. The challenges are exacerbated by insufficient access to top experts in the field and a lack of appropriate technological support for summarizing and maintaining the knowledge gained for current and future reference. As a result, companies file fewer patents and avoid analysis that can help detect infringement before litigation. In some embodiments, the present invention solves certain limitations by automating the analysis process, driving the workflow, and providing and maintaining summarized assessments with which the users can interact. Of course, there can be other modifications, alternatives, and variations.

Examples of consumer-level applications may include: Seeking online advice, how-to instructions, self-education; Personal health education; Pre-shopping: gathering information about a product category (not necessarily specific products or prices); Finding good sources of a certain type of information; Homework help, college "literature" research—to produce report; Looking for community resources; Finding online social networks and affinity groups; Planning trips: business vs. vacation, with sections for different kind of information: meeting facilities, transportation, maps, road conditions, accommodations, tourist information, health/safety advisories, cultural background; and the like.

The inventors recognize that various embodiments of a system intended to emulate human level understanding of information may perform at least the following three basic functions: 1) Extract approximations of human level understanding from various forms of communication; 2) Codify the extracted meanings into representations that afford high speed retrieval and analysis; 3) Translate the stored understandings (representations of meaning) in real time into knowledge by organizing, associating, and relating the extracted knowledge based on the significance established by a given task.

A problem in codifying mental representations is to identify suitable structures that can allow knowledge to be represented and stored. However, it is desirable that such knowledge is stored without anticipating specifics of how the knowledge may be used and without any prior association or organization of the knowledge. In other words, not storage within a pre-defined organization structure. Additionally, the knowledge may be stored such that in response to input, the relevant desired knowledge can be quickly identified, extracted, organized, and presented. Another problem is in forming a knowledge representation structure that produces a greatly reduced representation. This is desirable to reduce the amount of memory to store such knowledge, such as the millions of documents stored on Intranets and the billions of documents found on the Internet.

In various embodiments of the present invention, capturing and codifying human level understanding is inferred from various communication systems. Various embodiments are believed to provide consistent results and be practical. Various embodiments are based upon theories of cognitive psychology and semiotic systems—i.e. the science of how meanings are established and how reality is represented. This may be applied to the intent of those creating and interpreting content as well as in the various forms of its representation.

Various embodiments are designed to capture the cognitive processes of a semiotic system should itself be composed of syntactically structured representations that preserve the characteristic properties of cognitive states. It is also possible to capture the concepts being represented without any understanding of what the concepts actually mean.

According to one aspect of the invention, a method for a computer system is disclosed. One process includes receiving an input source comprising a plurality of sentences, determining a set of semiotic relationships from the plurality of sentences, and performing a contextual correlation in response to the set of semiotic relationships and in response to an ideas index to determine a reduced set of semiotic relationships from the set of semiotic relationships. One technique includes comparing the reduced set of semiotic relationships to each of a plurality of semiotic relationships associated with a set of documents to determine comparison values, determining a reduced set of documents from the set of documents in response to the comparison values, and outputting portions of the reduced set of documents to a user.

According to another aspect, a computer system is disclosed. One apparatus includes a portion configured to receive an input source comprising a plurality of sentences, a synchronic portion configured to determine a set of semiotic relationships from the plurality of sentences, and a contextual correlation portion configured to determine a reduced set of semiotic relationships from the set of semiotic relationships in response to the set of semiotic relationships and in response to an ideas index to determine a reduced set of semiotic relationships from the set of semiotic relationships. A device includes a comparing portion configured to compare the reduced set of semiotic relationships to each of a plurality of semiotic relationships associated with a set of documents to determine comparison values, a portion configured to determine a reduced set of documents from the set of documents in response to the comparison values, and an output portion configured to output portions of the reduced set of documents to a user.

According to another aspect of the invention, a computer program product resident on a tangible media includes code executable on a computer system is disclosed. The computer program product may include code that directs the computer system to receive an input source comprising a plurality of sentences, code that directs a processor to determine a set of semiotic relationships from the plurality of sentences, and code that directs a processor to perform a contextual correlation in response to the set of semiotic relationships and in response to an ideas index to determine a reduced set of semiotic relationships from the set of semiotic relationships. A computer program product may also include code that directs a processor to compare the reduced set of semiotic relationships to each of a plurality of semiotic relationships associated with a set of documents to determine comparison values, code that directs a processor to determine a reduced set of documents from the set of documents in response to the comparison values, and code that directs a processor to output portions of the reduced set of documents to a user.

Various additional objects, features and advantages of the present invention can be more fully appreciated with reference to the detailed description and accompanying drawings that follow.

BRIEF DESCRIPTION OF THE DRAWINGS

FIG. 18 illustrates a computer system according to an embodiment of the present invention;

FIGS. 22A-F illustrate experimental results.

DETAILED DESCRIPTION OF THE INVENTION

Figure 1:
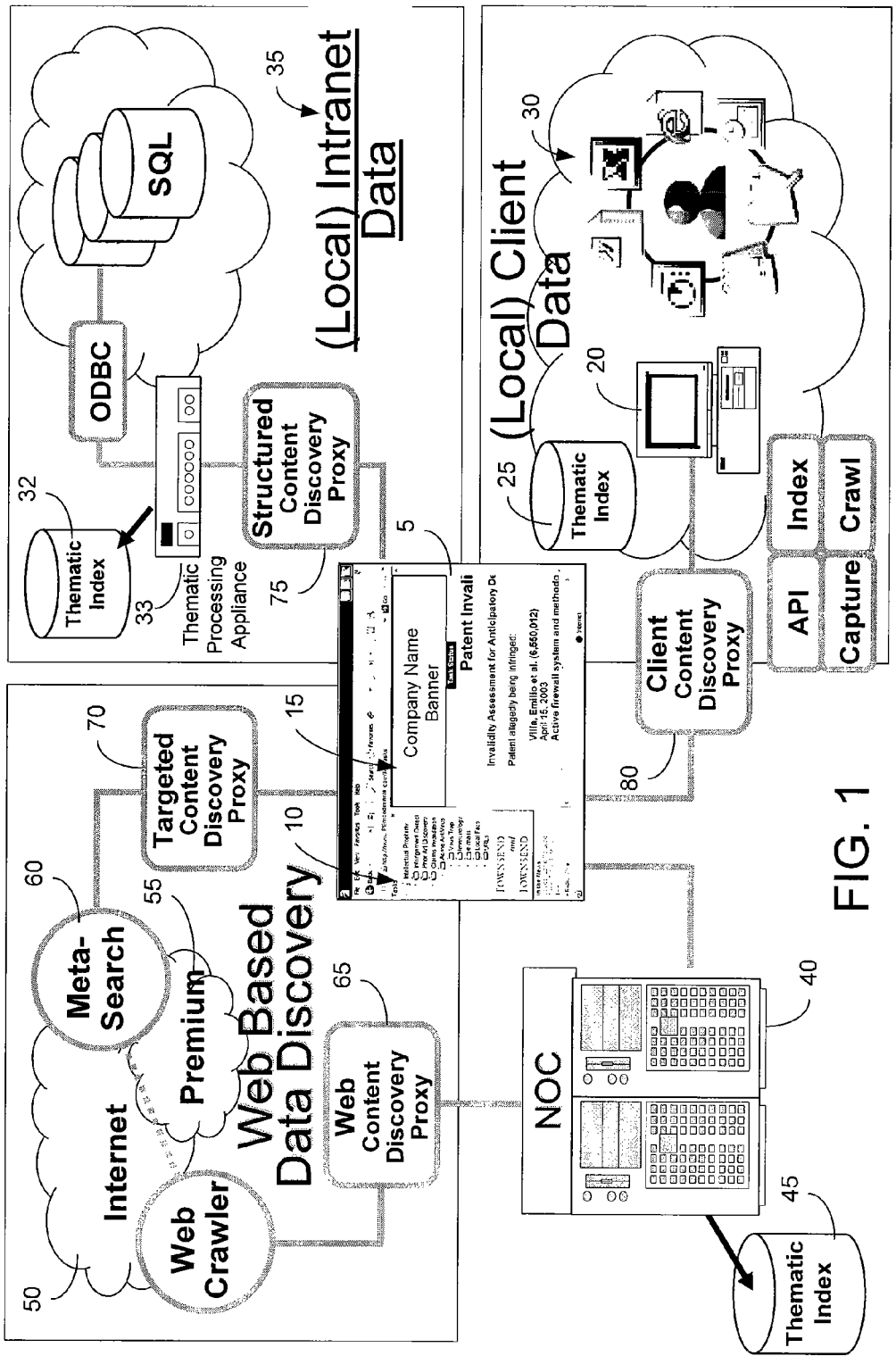
FIG. 1 is a simplified diagram of a thematic system according to an embodiment of the present invention.
Figure 2:
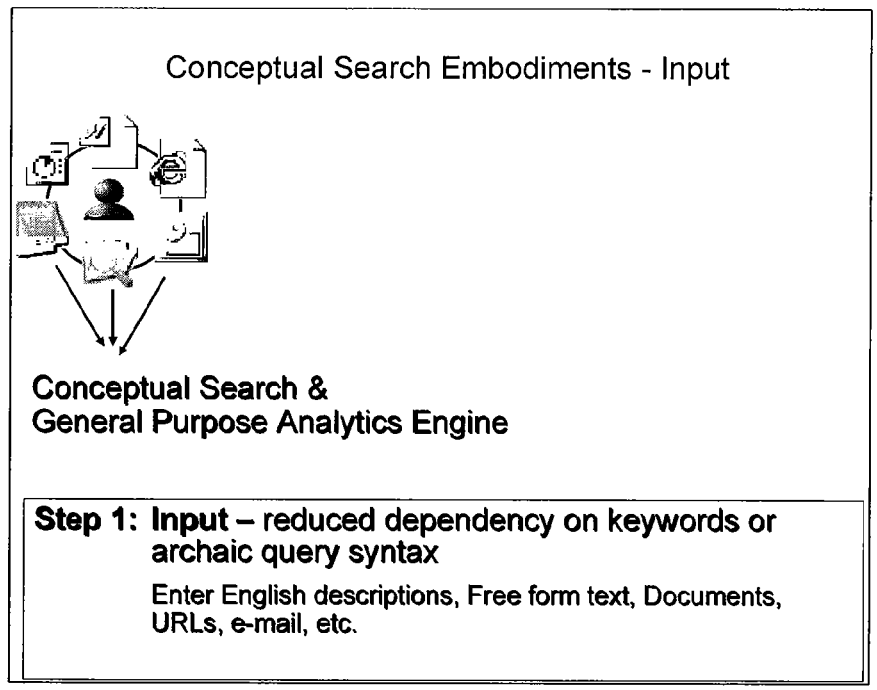
FIGS. 2 through 8 are simplified diagrams illustrating an exemplary thematic method according to embodiments of the present invention.
Figure 3:
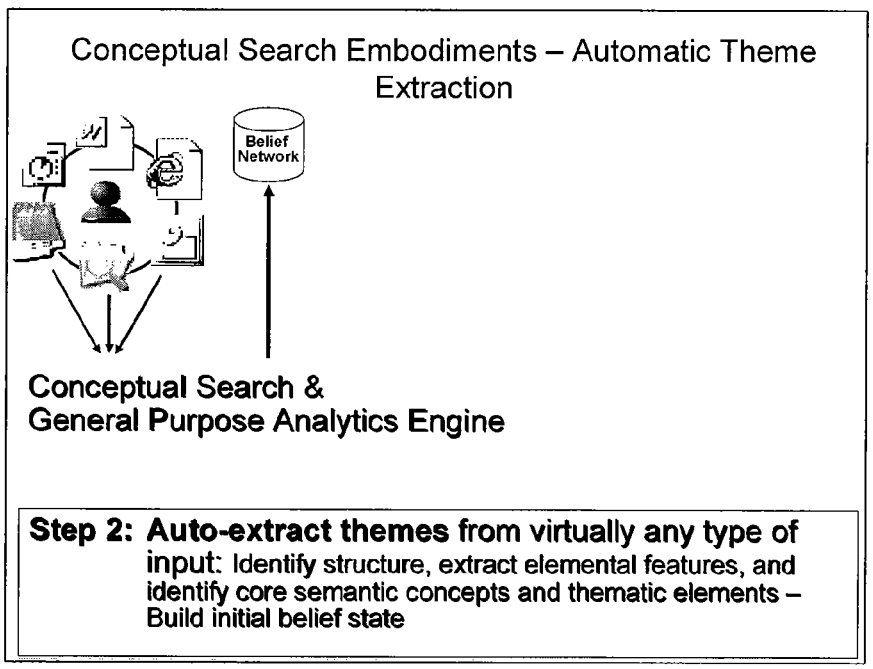
Figure 4:
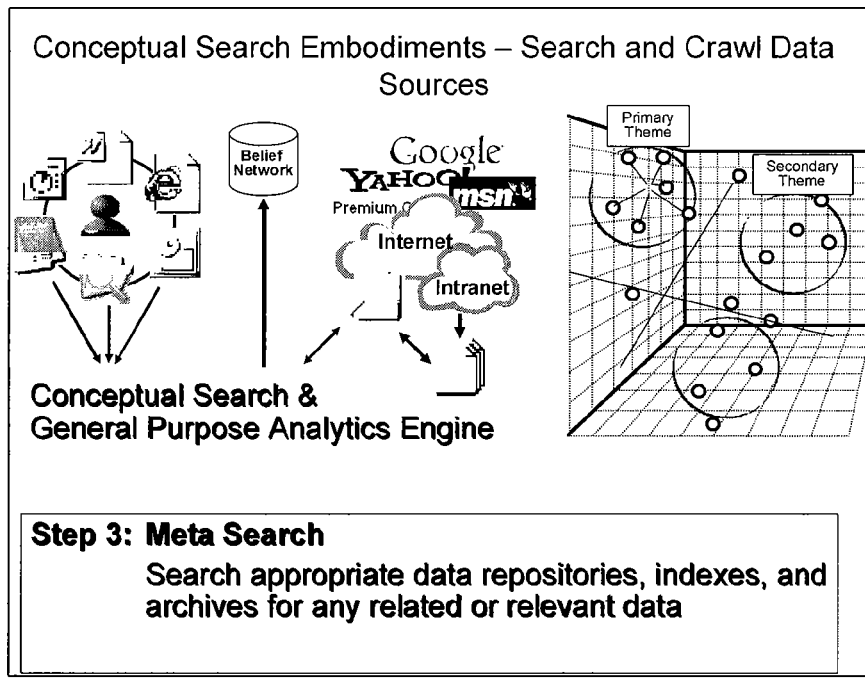
Figure 5:
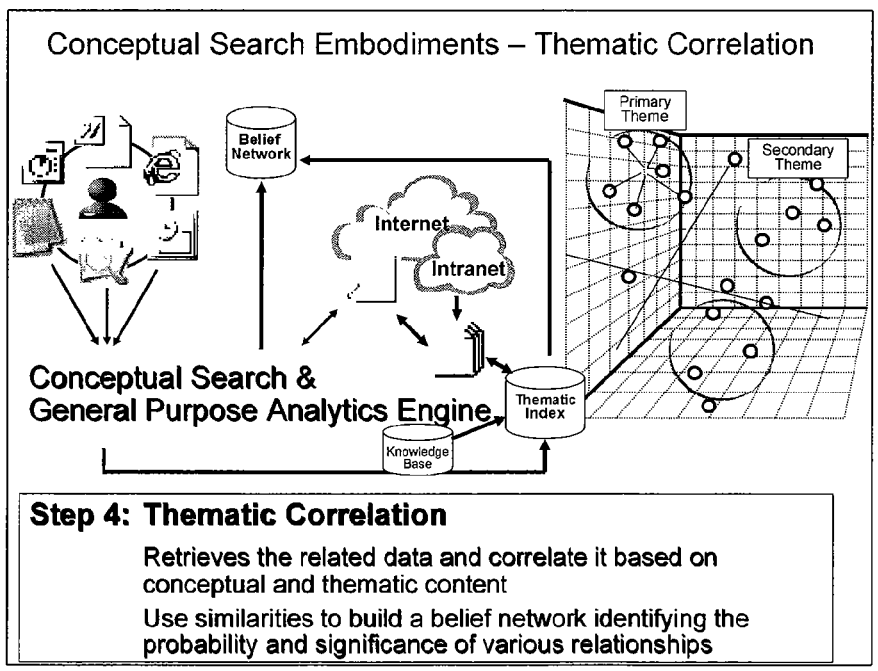
Figure 6:
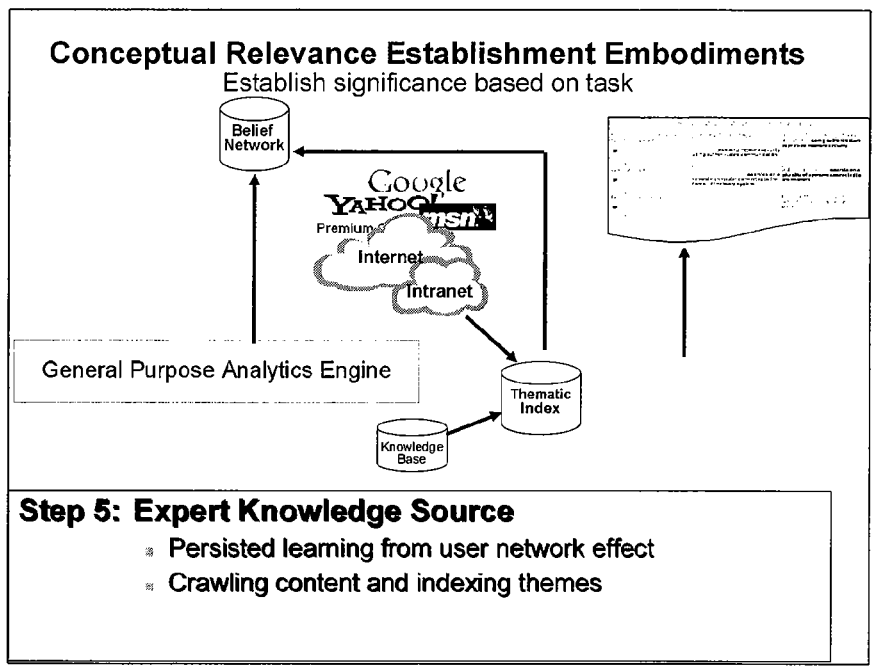
Figure 7:
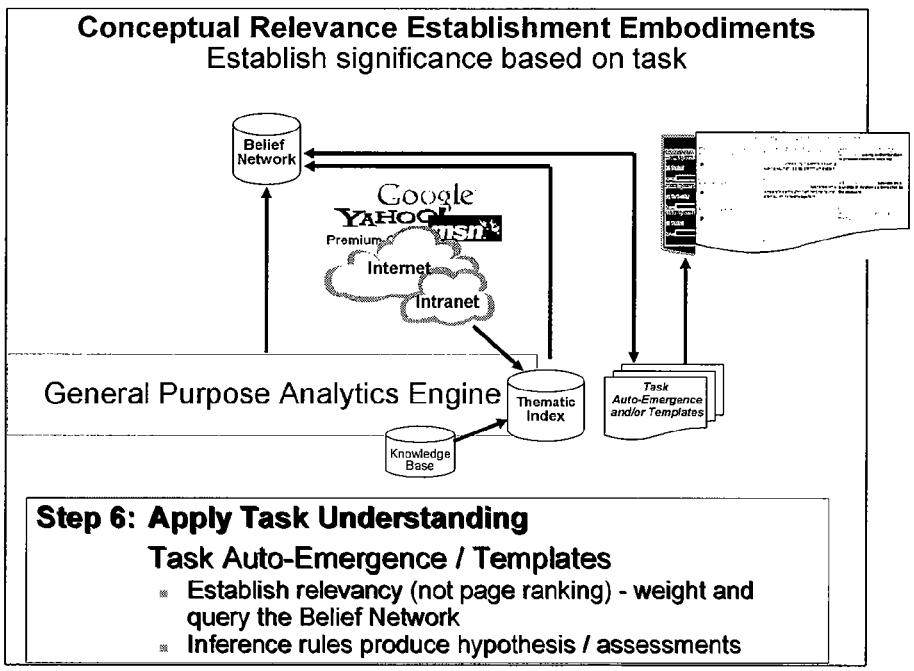
Figure 8:
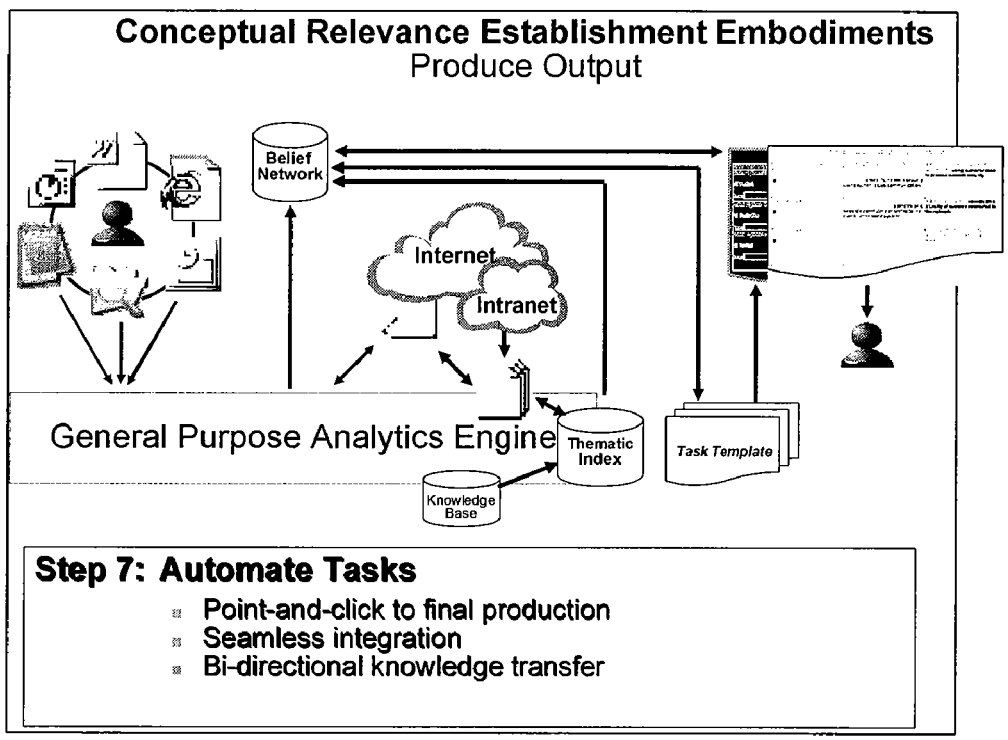

According to the present invention, techniques related generally to processing techniques of one or more objects from one or more information sources are provided. More particularly, the present invention provides methods, systems and graphical user interface for processing information using a thematic based technique, including process and system, to perform, for example, web searching. Merely by way of example, the invention has been applied to searching web sites, but it would be recognized that the invention has a much broader range of applicability. The invention can be applied to searching web sites, information associated with URLs, patent documents (e.g., patents, publications), intranet data, electronic messages, streaming data that includes natural language text, such as closed captioning on video/multimedia feeds, any combination of these, and the like, as discussed earlier.

Glossary of Terms

Synchronically—construction takes place in terms of "key" or "Master" signifiers that have meaning established outside the discourse (e.g. input document).

Diachronically—as a sentence, syntagma, or piece of a discourse on folds, each sign will modify the signs which preceded them thus retroactively constructing and "sealing" their meaning.

Syntagm—a locally ordered collection of signs e.g. a sentence or phrase.

Paradigmatic relations—relations of substitutability e.g. cat feline, etc.

"Literal" denotations—recognition of identifiable objects irrespective of the larger connotations.

Anthropological linguistics—Individual terms do not have intrinsic identities but rather are significant in relation to their place in the structure of a larger system (for example a manifestation of culture). To infer any meaning, one must consider not just the terms but the relations between them.

Unlimited semiosis—interpretant producing further signs. Following the Peircean notion of semiosis, all texts have a continuum of intermediate positions. That is to say that texts have many possible senses and the interpreter selects a possible sense by approaching the text in light of a given topic or experience.

Semiotic process—an indefinite interpretive activity which necessitates individual inference from a doctrine of signs and a phenomenology of an individual's experience. Any semiotic expression X is a signifier for the signified Y which is absent. The process that leads the interpreter from X to Y is inferential in nature. The semiotic approach differs from logical semantics in that, from a semiotic perspective, the concept of "truth" as an objective correspondence to a real or possible world is not considered useful or important.

Semiotics value—is established when one thing can be exchanged for dissimilar things and can be compared with similar things. For example, when a word can be compared with another word and exchanged for an idea.

Sign=correlation between signifier and signified, expression and content. Meaning=the relationship between signs=value.

Concept: A set of signs (keywords, phrases, etc.) and the grammatical constructs forming relations between the signs that can be interpreted as conveying a fundamental unit of meaning. A series of progressing signs where signification produces some value. The denotative and connotative value is codified into a compressed mathematical media (symbols/text to numbers). Represents the basic unit of thought that is being communicated.

Themes: a logical grouping of concept formatives that represent an expression of a single thought. Themes are auto-emergent from sections of a discourse. Auto-emergence occurs during a post-analysis processing step where theme discovery is performed by identifying and associating elements of related concepts within a section. Themes capture context at a less granular (more semantic then syntactic) level than concepts. A subset of the plurality of concepts that complete a consistent thought.

Ideas: a representation of a transcendent entity that is formed through a pattern of associated elements of objective meaning Ideas represent a higher level of abstraction than a concept by classifying conceptual formatives. Ideas are typically captured a priori and are often hierarchical.

Ontology: A set of distinct objects resulting from an analysis of a domain.

Taxonomy: A particular arrangement of the elements of an ontology into a tree-like class structure.

Object hierarchy: From computer science, a taxonomic arrangement of objects in an ontology where objects receive or inherit features from their ancestors in the taxonomy.

Precision: In Search Performance Analytics, the ratio of the number of relevant documents retrieved to the total number of documents retrieved.

Recall: In Search Performance Analytics, the ratio of the number of relevant documents retrieved to the total number of relevant documents in the collection.

False Positive: In Search Performance Analytics, an irrelevant document that was retrieved from the collection.

False Negative: In Search Performance Analytics, a relevant document that was not retrieved from the collection.

Meta-Search: The process of incorporating multiple search engines (typically utilizing different technologies) by simultaneously posing search queries to each engine and then listing, aggregating, or otherwise combining the results returned from each search engine into a unified list. The goal is to capture the best features of each individual search engine, leveraging the strengths of each search engine's underlying technology, to produce the best results for specific tasks.

Anaphora Resolution: The problem of resolving what a pronoun, or a noun phrase refers to Information Extraction (IE): The process of analyzing unstructured texts and extracting the information relevant to some problem into a structured representation (selective information structuring). IE systems perform various information extraction tasks such as:

Named Entity recognition (NE)—finds the entities in the text.

Co reference Resolution (CO)—finds identities between entities.

Template Element construction (TE)—finds the attributes of the entities.

Template Relation construction (TR)—finds the relations between entities.

Scenario Template construction (ST)—finds the events in which entities participate.

For a more complete description of Information Extraction tasks, see the Message Understanding Conference (MUC) classifications.

Entities: Persons, organizations, locations, etc. that are located in the text.

Entity Attributes: The attributes that are related to the entities (e.g. the title of the person or the type of the organization).

Analyzer/Grammar Parser: The analyzer performs various computational linguistic and shallow grammar parsing task (part-of-speech determination, phrase structure determination, etc.), stemming, anaphora and co-reference resolution, etc. The Analyzer uses a semiotic knowledge base to identify and associate sign senses with the text through a three phase process; the synchronic phase, the diachronic phase, and the sealing phase. The steps in each phase may be repeated in part or in their entirety. For example, following a first pass through the diachronic and sealing phase, ideas associated with the general concepts are identified. These ideas can then be use to identify domains/topics of reference which in turn can be used to seal further remaining ambiguities (such as ambiguous acronyms, etc.). The output from the analyzer is a plurality of concepts that are combined, based on their relationships into, a plurality of themes.

Lexeme: A meaningful linguistic unit that is an item in the vocabulary of a language.

Stemming: The act of applying a morphological process (inflection, derivation, compounding, etc.) to a single lexeme in order to support the productive nature of natural language, infer syntactic and semantic properties of new words, and reduce the need to enumerate all forms of a lexeme in a lexicon (dictionary or semiotic knowledge base).

POS Tagging: Part-of-speech (POS) tagging is the act of identifying the syntactic or grammatical categories (parts-of-speech) into which a word or a group of words in a text may be classified (e.g. lexical or foundational categories, noun, verb, adjective, noun-phrase, etc.). For a list of common POS tag see the Brown Corpus tags.

Computational linguistics (CL): An interdisciplinary field dealing with the statistical and logical modeling of natural language from a computational perspective. CL generally deals with issues such as phonology, morphology, lexicography, syntax, semantics, discourse, pragmatics and dialogue, formal grammars and languages text-segmentation, part-of-speech tagging, parsing, word-sense disambiguation, anaphora resolution, and natural language generation.

FIG. 1 is a simplified diagram of a thematic system according to an embodiment of the present invention. This diagram is merely an example, which should not unduly limit the scope of the claims herein. In light of the present patent disclosure, one of ordinary skill in the art would recognize many variations, modifications, and alternatives.

FIG. 1 describes various embodiments of the present invention. In this example, one or more users are provided a graphical user interface 5 providing the user with a view 10 of data sources and data classifications organized by theme and/or classification, as will be described below, and a view 15 of a data source or a thematically similar data source (e.g. a text document). Further details of embodiments of graphical user interface 5 will be described below. In various embodiments, graphical user interface 5 may support vertical solutions (e.g. market specific solutions) as well as horizontal solutions (e.g. end-user data discovery tools).

In the embodiments illustrated in FIG. 1, a client computer 20, provides graphical user interface 5 to an end-user. In one embodiment of the present invention, client computer 20 may include a thematic processing engine and/or a thematic index 25. In such embodiments, as will be described below, the thematic processing engine receives text containing natural language in the form of typing, cut-and-paste postal data, URLs, and/or one or more source data files from the user, and extracts themes from the provided source data. The thematic processing engine also processes one or more data files 30 resident on client computer 20, 50, 30, 35 available in the Internet and/or available on the Intranet to extract themes that populate thematic indices 25 and/or 45. In various embodiments, the extracted themes from the source data files are then compared to themes in thematic index 25 to attempt to locate files from client computer 20 that have similar themes to the extracted themes.

In another embodiment, a thematic index 32 may be located on an intranet or a local area network 35 with respect to client computer 20. In such examples, a thematic processing engine may also be used to extract themes from data files resident on LAN 35. These extracted themes are then included in thematic index 32 and correlated to locations of data files. In various embodiments, client computer 20 may also or alternatively reference thematic index 32 to attempt to locate files on LAN 35 that have a similar theme to extracted themes from the user's source data files.

In yet another embodiment, as illustrated, a centralized server 40 may be provided. In various embodiments, centralized server 40 is coupled to a thematic index 45. In various embodiments, a thematic processing engine may extract themes from various data sources, such as by crawling the Internet 50, premium (subscription-based) sources 55 (e.g. Wall-Street Journal, Westlaw, Lexis), public data sources, and the like. The extracted themes are associated with the appropriate network location within thematic index 45.

In another embodiment, the thematic processing engine in centralized server 40 may extract themes from search-type engines using "meta-search" 60 functionality. One example of meta-search functionality includes extracting key-words and/or appropriate Boolean-type expressions from themes extracted from the user's source data; using the extracted key-words as search terms into one or more search terms to identify potential documents; next, running the thematic processing engine on the potential documents to extract themes; then, using the themes extracted from the user's source data to find similarities in extracted themes of the potential documents, to identify potentially relevant documents for the user.

In various embodiments, also included in client computer 20 is task software that may process data from data sources deemed to be significant or relevant to the user's task. Such task software is envisioned to be included in more vertical market embodiments, such as patent law-related tasks, or the like. In other embodiments, the task-related processing and presentation can be provided centrally from 40, as an internet service, or 33, as an intranet service.

As illustrated in FIG. 1, any number of proxies 65-80 may be used to provide interfaces between the disclosed components.

A method according to an embodiment of the present invention may be identified briefly below.

Step 1: Input—unlike conventional methods, a user need not enter keywords or form queries using archaic query syntax. In various embodiments, the user enters or highlights textual descriptions of a theme or a concept; enters or highlights free form text; selects documents, URLs, e-mail messages; and the like, etc.

Step 2: Automatic or Manually initiated extraction of themes from virtually any type of input, as discussed above. In various embodiments, a thematic processing engine performs one or more of the following tasks: identifying linguistic structure of the input, extracting elemental features (e.g. proper names, dates, facts); and identifying core semantic concepts and thematic elements. Based upon the analysis, an initial "belief state," described below, may be formed.

Step 3: Meta Search—As described above, Meta searching may be used in various embodiments as a targeted search of appropriate data repositories, indexes, and archives for any related or relevant data.

Step 4: Thematic Correlation—Based upon themes extracted from the input data source, a thematic index may be accessed and commonalities in themes can be identified (possibly in real-time) based upon correlation with conceptual and thematic content. The similarities of themes identified are used to form the initial belief network. The belief network identifies themes that are believed (e.g. based upon probability and/or elemental features) to be "interesting" to the user based upon the extracted themes in step 2. Themes can be identified based on how association of relationships cluster together.

Step 5: Expert Knowledge Source—In various embodiments, thematic correlation within a thematic index may be based upon input from previous users within an organization. Such embodiments provide persisted learning and belief states from individual users, as well as network effects (e.g. other users). In various embodiments, a thematic index is based upon themes extracted from meta searches as well as crawling web sites, etc. across the web.

Step 6: Apply Task Understanding—In various embodiments, vertical applications may include a series of "tasks" to perform. These tasks can be used to supplement thematic correlation efforts. In light of such tasks, the relevancy of data sources are based not on page ranking, but upon the thematic similarity and task, as well as the Belief Network. Additionally, inference of user behavior (e.g. thematic query refinement from user navigation) may provide additional rules produce hypothesis/assessments.

Step 7: Automate Tasks—As illustrated in FIG. 1, graphical user interface 5 is provided for the used to point-and-click to a final production. Accordingly, to the user data from multiple sources can seamlessly be provided in response to a user's task. In various embodiments, the user's belief state may be used by centralized server 40 to update a knowledge database.

As an example of a task, a user's task may be to invalidate a particular patent. To do this, themes of the particular patent are extracted as well as elemental features (e.g. dates, proper names, etc.), and then the extracted themes are compared to extracted themes of prior art, publications, product information, marketing data, patents that have already been included in thematic index 25, 30 or 45. Prior art are then organized by similar themes and/or by elemental features, and then presented to the user as an initial belief state. Next, the user determines the significance or relevance of the identified themes and/or patents. Once the user has located a patent she believes is invalidating, the task software automatically produces a claim chart, with elemental features e.g. claims from the particular patent, in a left-column of a two-column table, and reproduced citations from the invalidating prior art in the right-column of the table. In various embodiments, the user may then review, edit, and/or print-out the claim chart for further review, or the like. In other embodiments of the present invention, the task software may be resident in centralized server 40, or the like. In such embodiments, the task software will also provide the user data formatted according to the user task, e.g. a invalidity claim chart.

In other embodiments, a user's task may be a consumer-type requirement, such as seeking online advice, how-to instructions, self-education; seeking information about health issues; seeking shopping-related information; seeing good sources of information; seeking help with homework, or college "literature" research; seeking community resources or services; seeking online social networks and affinity groups; seeking trip information for business or vacation, with sections for different kind of info: meeting facilities, transportation, maps, road conditions, accommodations, tourist information, health/safety advisories, cultural background, and the like. Accordingly, the results may be in forms appropriate for the user's task.

The above sequence of steps provides methods according to embodiments of the present invention. As shown, the methods use a combination of steps including a way of processing information objects using a thematic based approach. Other alternatives can also be provided where steps are added, one or more steps are removed, or one or more steps are provided in a different sequence without departing from the scope of the claims herein. Further details of the present method can be found throughout the present specification and more particularly below.

FIGS. 2 through 8 are simplified diagrams illustrating an exemplary thematic method according to embodiments of the present invention. These diagrams are merely an example, which should not unduly limit the scope of the claims herein. One of ordinary skill in the art would recognize many variations, modifications, and alternatives.

The Inventors of the present invention have recognized that there is a growing gap between the generation of information from word processing files, local data, data on the web (e.g. web pages) and the ability for users to extract such knowledge. This is especially true over the internet as most web pages include unclassified and unstructured data. The unstructured nature of web sites makes it difficult for current search-engine technology to classify such web sites.

In light of this, the Inventors have determined that it is desired to create a general purpose platform that can automatically or on-demand acquire knowledge from data sources by extracting and storing searchable representations of the themes described within these sources. The representations (thematic index) may also capture domain expertise and allow for high-speed indexed searching, analytic processing, and automated workflow, guided by task based rules. Additionally, the Inventors have determined that it is desired to provide one or more interactive graphical user interface to assist users in completing complex tasks, based upon the acquired knowledge. Accordingly, embodiments of the present invention are directed to attempt to replicate human "common sense" understanding of data sources and search input to provide basic cognitive analyses, and to identify, extract, and present information relevant to a specific user task.

In various embodiments of the present invention, two specific components include a "thematic extraction" from data sources, which provides the "common sense" understanding of the data source, and a "task-based" analytics, which provides the basic cognitive analysis and refinement functions. Various embodiments also include: identifying key concepts being conveyed in a data source; relating the identified key concepts to key concepts conveyed in other data sources; determining the significance of the concepts within the data source with respect to the data source, and with respect to the cognitive analysis task; identifying what data sources convey related key concepts including the significance of the concepts for the given task, and the relationship of the related key concepts to the key concepts of the data source.

Various embodiments include functionality that can be classified into three general categories: a user interface, a processing engine, and tasks. In various embodiments, the user interface provides a graphical user interface that provides one or more of the following functions: allows the user to navigate based upon relevancy of data, provides a unified view of the data so a user can explore related data sources, provides a task-based user interface so a user can easily switch between tasks without losing their context, provides a single-step search/discovery interface, and the like. In various embodiments, a processing engine provides one or more of the following functions: a "theme" and concept extraction capability of data sources (e.g. web pages, text documents, etc.); a real-time discovery of data; user and task-based relevancy, significance, and refinement; and the like. In various embodiments, a task-based aspect provides one or more of the following functions: allows context based querying by the user, allows vertical solutions to be more easily implemented based upon search and analytics; allows deep meta searching; and the like.

An example of a user interface is illustrated below. As illustrated, a content pane typically includes the data source the user is currently reviewing. The content repository includes one or more tasks, as well as prioritized data sources believed of interest to the user for each of the tasks. The type of data sources may include freely-available web content, subscription-based web content (e.g. Wall Street Journal), local files, e-mails, and the like.

Advantages of embodiments of the present invention include that thematic extraction and contextual search allows users to: more easily find and understand key concepts in data sources, more easily find meaningful and relevant information to the user, more easily filter-out irrelevant data sources, less likely to filter-out relevant information, see data source ranked by relevance to the user's task, and the like.

Some embodiments of the present invention provide a concept-based search and analytics methodology and platform. This includes the ability for users to find relevant information based upon concept-level ("thematic") matching of data sources. The data sources may include Internet sources, Intranet sources, user-desktop sources, subscribed information sources, and the like. The task-focus ability allows end-to-end solutions in vertical markets. The task-focus are directed toward specific application/business tasks. In some embodiments, an example of a business task may include finding invalidating prior art for a patent, finding articles about a particular topic, or the like. In various embodiments, the rules specified by the task determine relevance of data sources for the task based upon the thematic matching. For example, for invalidating prior art to a target patent, one rule may be that the prior art must be publicly available greater than one year before the filing date of the target patent. In light of this disclosure, many other types of rules may be used to determine the relevance of data sources. In embodiments of the present invention, relevant data sources are revised in response to the "significance" assigned by the user of particular relevant data sources, as will be illustrated below.

Embodiments of the present invention, thematic extraction may be performed on a number of data sources. In one embodiment, thematic extraction of data sources may be performed based upon meta-data provided by searching firms such as Yahoo!, Google, MSN, or the like. In another embodiment, thematic extraction of data sources may be performed by crawling data on an intranet. In another embodiment, thematic extraction of data sources may be performed by crawling data on a desk top (e.g. e-mail). In yet another embodiment, thematic extraction of data sources may be performed by crawling the web. As described herein, based upon the thematic extraction of various data sources, one or more thematic indices may be populated.

In various embodiments of the present invention, thematic extraction is performed based upon "meta search" strategies. One example of this includes receiving a data source such as a document from the user; automatically extracting themes from an original data source; determining an "optimal" set of keywords, keywords based upon the extracted themes; performing a search on the extracted key words on keyword based server systems and/or meta-data, if any, of a data stores, to identify potential data sources; extracting themes from the potential data sources; then correlating the extracted themes from the potential data sources to the extracted themes from the original to determine data sources from the potential data sources that have extracted themes similar to the extracted theme from the original data source. The similarities of themes extracted from the data sources are then used to build an initial "belief network." In various embodiments, the belief network represents an initial state of the correlation of data sources. As will be describe below, when the user indicates specific data sources are more important, the belief state (organization and prioritization of data sources) typically changes.

In various embodiments, the relevance of data sources are determined for specific tasks. The specification of rules that define relevance are typically defined by one or more users knowledgeable in that specific area. In one example, if a task is finding an anticipatory patent to a target patent, as discussed above, one relevance rule would be that the anticipatory patent must be published one year before the earliest priority data of the target patent. Similar rules may be specified for the specific tasks supported.

In operation, in various embodiments, users are initially displayed a graphic representation of the belief state. This typically includes prioritizing data sources according to the initial belief state, after relevance of the data sources, discussed above, have been determined. In response to the display of the prioritized data sources, the user may select one or more data sources as being more significant relevant and/or less relevant to what the user is interested in. In various embodiments, based upon this user input, the belief state may be modified, and the list of prioritized data sources may be modified to reflect the user's significance ratings.

In various embodiments, the significance rating of the user may be determined explicitly or implicitly. For example, an explicit significance rating may be a user selecting a "thumbs up" icon, a "thumbs down" icon, or the like; and an implicit significance rating may be a user navigating deeply down one specific path, or the like. Based upon the present patent disclosure, one of ordinary skill in the art would recognize that other types of user feedback mechanisms may also be used, such as a relevance slider bar; an inferential analysis engine (e.g. based upon observing which "drill-down" links the user selects, an amount of time the user spends at different links, or the like); or other mechanism.

In various embodiments, at any time, a user may suspend the task, perform other actions, and return to the task. In such embodiments, a profile of the user's "belief state" is stored, typically on the user's computer or at a convenient location, and may be retrieved at a later time to restore the state of the task for the user. In various embodiments, the profile includes a determination of "relevant" data sources (e.g. documents) determined by the task criteria, as well as the significance ratings of the documents by the user. In various embodiments, when the user restores the profile, the system may include additional relevant documents newly identified in the thematic index since the last time the user restored the profile. In such embodiments, this functionality provides the user with up-to-date relevant data sources.

In various embodiments, the task also specifies the production of output for the user in a convenient form for the user. In other words, instead of the end product being merely a prioritized list of data sources, the task may include extracting specific sections and formatting of data from the data sources. In an example, when the user is running a patent invalidation task, the desired and convenient form for analysis is a claim chart. In this example, the data in the claim chart typically would include claim language of the target patent in the left column of the chart, and citations from one or more prior arts in the right column of the chart. Many other types of output formatting may also be envisioned, for example, a bibliography may be automatically generated, a list of points and citations may be automatically generated, summarization of topics may be automatically generated and the like. In various embodiments, the task may also include converting a document into a specified format, sending a document to a specified recipient, invoking a specified process, or the like.

As illustrated in the attachment, a platform may include a thematic extraction module, and analytics engine coupled via a work flow bus. The data source input may be "web data" from a meta-data search, crawling one or more data source, or the like. Based upon the concepts of the data sources, the themes of the data sources can be determined and stored in one or more thematic indices. Additionally, the platform may include one or more belief networks, for example, corresponding to specific tasks. As discussed above, these belief networks for specific vertical markets may require input from those skilled in the markets. In various embodiments, the belief networks form an initial grouping and/or prioritization of data sources according to themes in the thematic indices. As discussed above, the web infrastructure for data sources may include a meta-data search interface, a web crawler, one or more intranet or desk top crawling interfaces, and the like.

In various embodiments of the present invention, thematic extraction of data sources is determined by linguistic (grammar) analysis of the data, as well as concept extraction. In some embodiments, grammar rules specific to the specific search language are known. For example, in English, sentences typically include a noun phrase and a verb phrase. Further, a verb phrase may have a noun phrase following the verb, making it the object of the sentence. Additionally, phrases are always one or more words possibly with grammatical morphemes. As a further example, if an object is not present, the object of the sentence is the same as the subject of the sentence. Other types of grammar rules may be used for English, as well as different rules for different languages. Other types of grammar rules that may be used are illustrated in the attachment, such as phonology, graphemes, orthography, syntactic class, interpretation, morphology, syntax, lexicons, and the like.

It should be noted, that in contrast to full-blown natural language processing technologies, "understanding" of the data is not required in embodiments. Instead, in various embodiments, simpler linguistic analysis is performed. In one embodiment, four aspects of linguistic analysis are derived: linear progression, symbolic meaning, context, and structure. In various embodiments, context and structure may be combined into one aspect.

As illustrated in the attachment, linear progression analysis is performed by analyzing the sequence of occurrence of semantic formatives from left-to-right, in English. In various embodiments, symbolic meaning is established based upon graphemes, orthography, syntactic class, interpretation, or the like. Examples of this are also illustrated in the attachment. In various embodiments, context is determined by words or symbols surrounding a word or passage that can give more meaning to the word. For example, words in a context may be causal, associative, factual, or the like. In various embodiments, structure may be determined based upon auto lexical grammar, and phrase-structure trees. Accordingly, the "thematic" analysis is not a traditional natural language process.

Figure 9A:
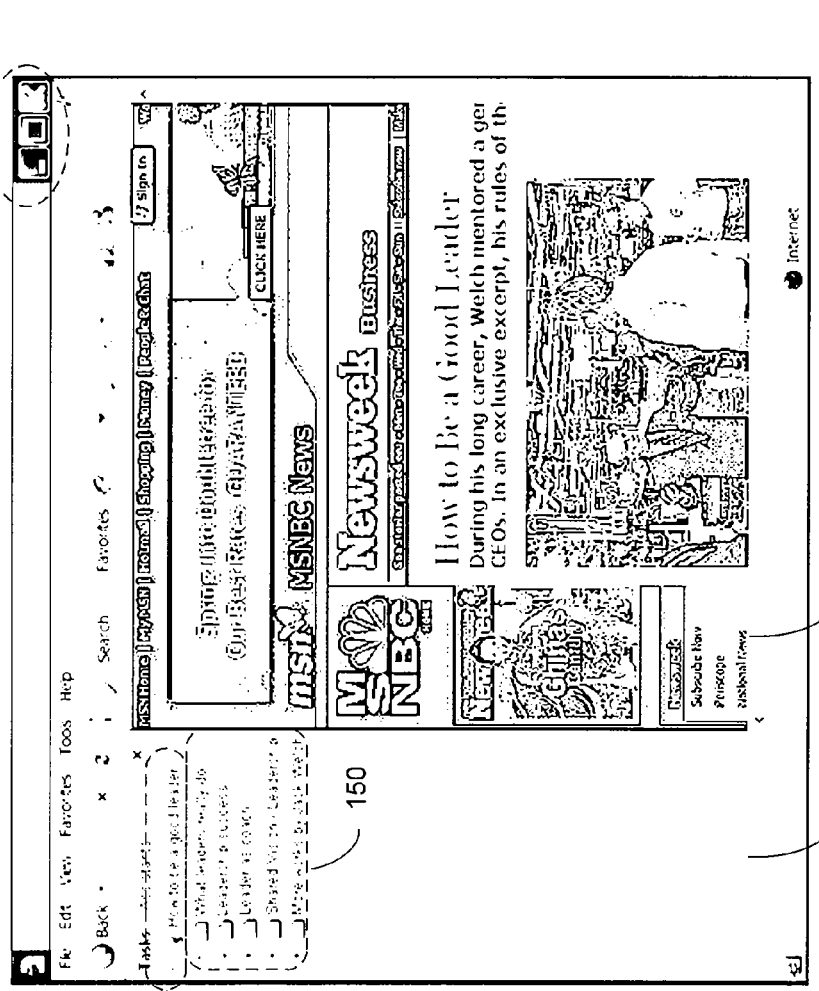
FIGS. 9A-10 illustrate examples of graphical user interfaces according to embodiments of the present invention.
Figure 9B:
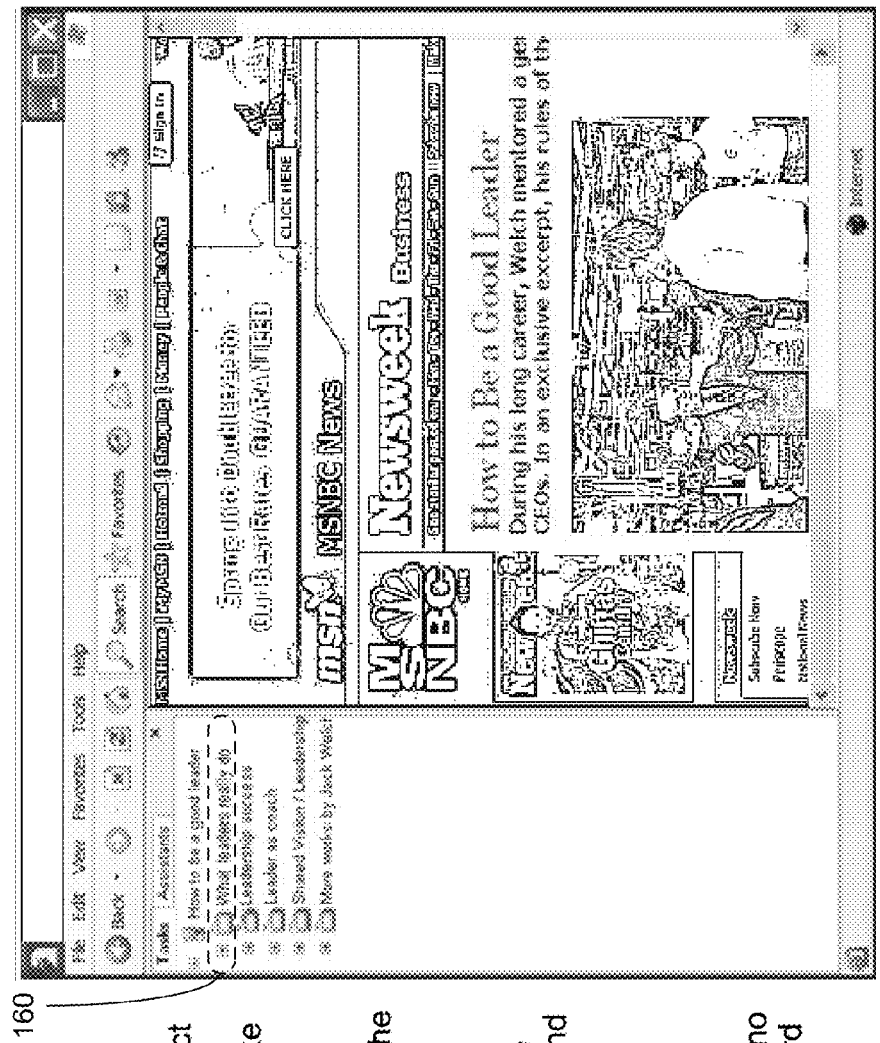
Figure 10:
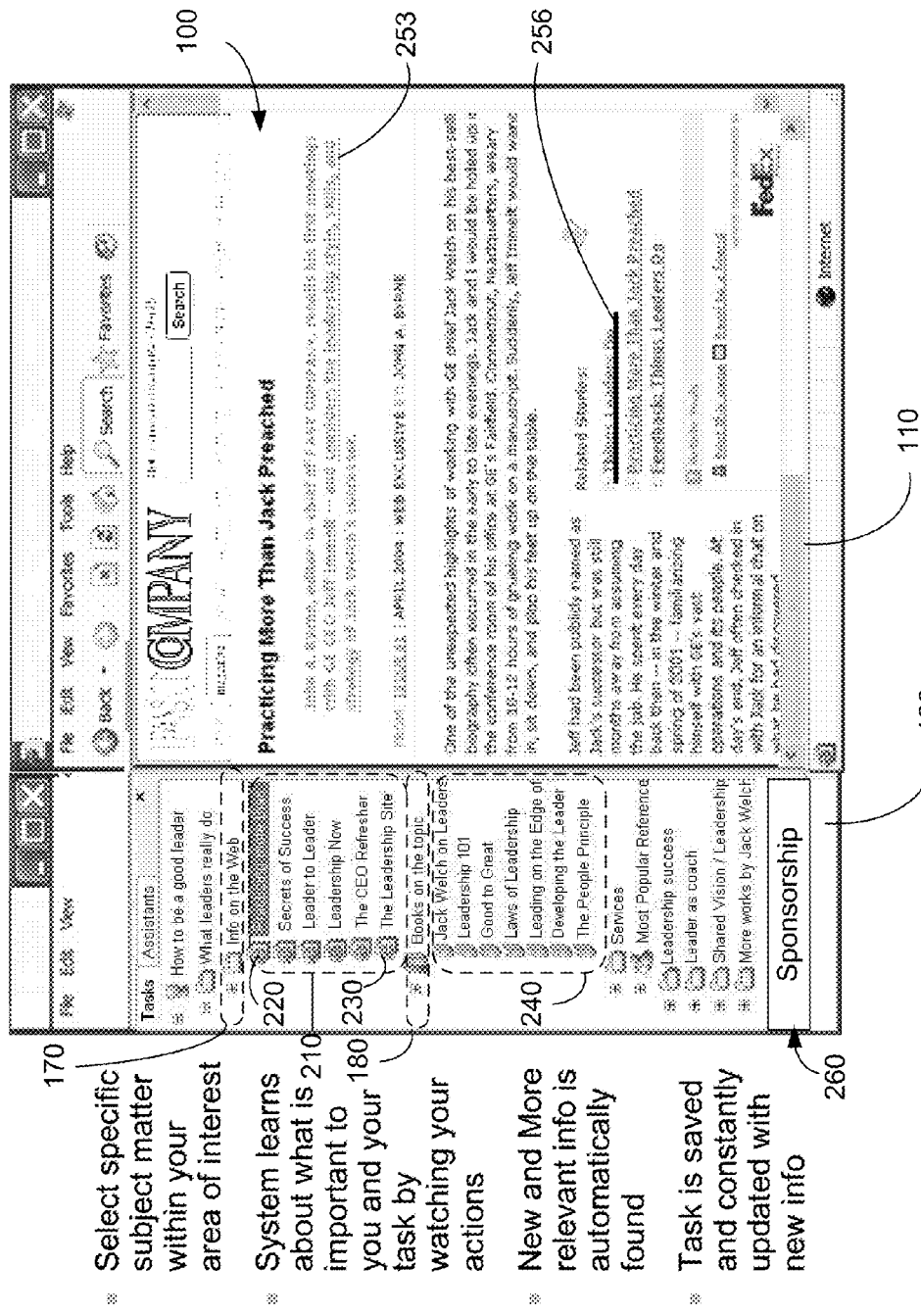

FIGS. 9A, 9B and 10 illustrate graphical user interfaces according to an embodiment of the present invention. In the example illustrated in FIG. 9A, a web page 100 is illustrated including a browsing pane 110 and a task pane 120. In various embodiments, the task pane may be implemented as a browser plug-in program. Task pane 120 may be may be positioned to the side of browsing pane 110, and/or provide a frame around browsing pane 110. In other embodiments, task pane 120 may be provided by a stand-alone program on the user's desktop. In such embodiments, task pane 120 may be a "snap in" window that visually positions itself next to a conventional web browsing window. Accordingly, task pane 120 and browsing pane 110 may each include conventional Windows graphical user interfaces functions 130.

In the illustrated embodiment, a user has identified the web page in the browsing pane as being "interesting." In various embodiments, the user may do this after she has viewed the web page, by clicking upon one or more options available in task pane 120. For example, once the user has opened the web page, the user may start a new "task" within task pane 120. In other embodiments of the present invention, the user may select one or more words or sentences from the web page, then invoke a new task selection within task pane 120.

In various embodiments to ensure user privacy, various embodiments only provide thematic matching only upon explicit user initiation of a new task, or the like. In other embodiments, a user may explicitly elect to have data in task pane 120 automatically update in response to data in the opened web page, as a research-type assistant. Even in such embodiments, task pane 120 should be able to be disabled for privacy concerns.

In this example, the user's task is seeking more "interesting" information similar to the web page. In response, using embodiments of the present invention, one or more themes 140 are extracted from the web page, and the extracted themes are compared to a thematic database to locate related themes. Next, web pages, and the like that are classified to include the related themes are returned to the user. In the example in FIG. 9A, task pane 120 presents one or more related themes in the form of folders 150 in various embodiments to the user. Web pages, and other data sources having these themes are included under folders 150. In various embodiments, searching of related themes from the thematic database may be done on-demand and on-the-fly, or cached from a previous crawl of the web page. As illustrated in this example, theme 140 "How to be a good leader" was extracted from the web page in browsing plane 110. Additionally, a number of folders 150, representing different themes, such as "What leaders really do," "leadership success," and the like are presented to the user in task pane 120.

As discussed above, an initial belief state may prioritize folders 150 based upon thematic similarity or relatedness to the extracted theme(s) from the web page. As will be illustrated below, the related themes may dramatically change in response to the user determination of significance of one or more themes.

In other embodiments, where one or more words or sentences are selected from the web page for the task, theme 140 would be extracted from the identified passages. In such embodiments, the themes described by folders 150 would represent themes related to themes extracted from the identified passages.

In FIG. 9B, the user has selected the theme 160 "What leaders really do" to view data sources available on this topic. As can be seen, data for the themes may be drawn and classified in any number of ways. In this example, web sites are placed in one category 170, books on the topic are placed in one category 180, services are placed in one category 190, popular references are placed in one category 200, and the like. In other embodiments, many other types of categorization may be formed according to the user's task requirements and/or features of the data sources. For example, if a task is to invalidate a patent, one category may be articles published earlier than the patent critical date, one category may be articles published after the critical date but before the patent filing date, categories may be articles published after the patent filing date, by the author, by the publisher, by general field, and the like. In such examples, features such as dates of publication may be derived from the article and used for categorization purposes. As can be envisioned in light of the present patent disclosure, many other types of categorizations may be done based upon categories relevant to the user's task, including theme, elemental features of the data source (e.g. proper names, dates, authors, company names, patent number, and the like), structural features of the data source (e.g. claim text, abstract text, and the like) data source, and the like. In other embodiments, categorization of data sources are at a higher "folder" level than classification by themes, as was illustrated above.

In various embodiments, data categorized may be drawn from multiple sources, such as intranets, users' desktops, article subscription sites, public databases, commercial databases, the Internet, and the like. Other embodiments also present a unification of structured data operations with unstructured data analysis. As a result, as shown as an example in FIG. 9B, what is thus presented by various embodiments of the present invention, to the user may be a unified interface of information the user may find "interesting" regardless of actual storage location of the data source (e.g. internet, intranet, desktop, etc).

In FIG. 10, the user has requested to view web pages 210 under category 170, as can be seen. As discussed above, an initial belief state may also prioritize web pages 210 based upon thematic similarity, possibly in combination with other criteria. For example, in this example, initially, web page 220 may be considered closer in theme to the original web page than web page 230. In other embodiments, web pages 210 may all have approximately the same thematic similarity as the extracted theme.

In FIG. 10, the user has also requested to view books 240 under category 180, as can be seen. Similar to above, books 240 may be prioritized based upon thematic similarity, possibly in combination with other criteria.

In the present example, the user has selected web page 220 from task pane 120. In response, in browsing pane 110, the appropriate web page appears. The user may review the content on the web page to determine if the web page includes information that she is interested in. In various embodiments, any number of annotations 253, 256 may be visually indicated on the web page, pointing-out to the user where the suggested similar theme is believed to be found on the web page. Annotations may be indicated to the user in any conventional manner, such as via a footnote-type indicator, highlighted text, underlined text, and the like. In light of the present disclosure, one of ordinary skill in the art will recognize that many other types of conventional graphical annotations may be used. (such as iconic views, difference style comparisons, etc.)

In other embodiments of the present invention, browsing pane 110 need not be limited to displaying web pages. For example, in embodiments where the user's desktop and/or network drives may be sources of information, browsing pane 110 may display data from the user's desktop, for example, previewing Word or WordPerfect documents, PowerPoint documents, Money or Quicken files, Visio files, or the like. Such embodiments tend to provide a "unified" data interface for the user. In addition, multimedia files can be organized by theme and specific topics can be located. For example videos containing subtitle text can be thematically analyzed allowing users to fast forward to topics relating to the input themes.

In various embodiments, the user may then implicitly or explicitly give a significance rating to the data source she views. In some embodiments, implicit rating of data sources is performed by weighting data sources viewed by the user as more significant, and weighting data sources not viewed as less significant; weighting data sources as relevant based upon number of times viewed for a task, amount of time the data source is viewed; or the like. In some embodiments, explicit rating of data sources is performed by a user rating viewed data stores with a number from 0 (not interesting) to 10 (very interesting); a thumbs-up, thumbs-down; a slider bar; or any other rating scheme. As will be shown below, based upon the significance ratings, the belief state may be altered, and the themes deemed relevant to the user may change for the particular task.

As illustrated in FIG. 10, ancillary regions 260 of the user interface may be provided. For example, in various embodiments ancillary region 260 may provide public-service messages or any other type of data (e.g. image, video, audio) based upon themes. In other embodiments, the ancillary region may be provided for data provided by sponsors. For example, Lexis/Nexis may sponsor all legal-oriented tasks regardless of the specific theme. In other embodiments, determination of one or more sponsors may be determined also upon the themes. More specifically, sponsors may decide to sponsor one or more themes from a thematic index. In such examples, when a user task requests data stores of themes similar or close to the sponsored themes, a public service message or a sponsor message may appear to the user.

In other embodiments, instead of "buying" themes, per se, a sponsor may provide one or more documents that describe what type of user they are interested in conveying a message to. In such an example, themes may automatically be extracted from the sponsor's description, and the extracted themes are then compared to themes identified in user's tasks. Accordingly, in such embodiments, the sponsors indirectly "buy" themes. In other embodiments of the present invention, any other type of information may be conveyed to the user based upon thematic closeness. In other embodiments, via question and answer session, or the like, potential buyers can "qualify" to receive information from available sponsors.

In various embodiments of the present invention, a sponsorship purchase mechanism, and methods for using such mechanisms may be implemented for sponsors. In some embodiments, themes may be auctioned and sponsors may place open or closed bids upon sponsorship messages for specific themes, or other categorizations. As examples, Amazon and Barnes and Noble may bid upon a "book" categorization of data sources, as will be illustrated below; Apple Computer and Dell may bid upon themes such as "computers that provide the user with a unified and simple user interface;" Lexis and Westlaw may bid upon sponsorship of vertical solutions, as described above, such as a vertical solution for locating potentially invalidating art to a patent; or the like. In other embodiments, a set amount may be offered for specific themes and/or closely related themes in a first-come first-served basis. In various embodiments, many methods for providing a sponsorship interface and supporting sponsorship infrastructure are contemplated by the inventors.

It is believed that sponsoring of "themes" provides sponsors with a much more effective reach than simply purchasing "key words" offered by conventional search engines. For example, if a company was offering business seminars for industry leaders they may purchase the keyword "leader." In such a case, the conventional search engine may return hits related to fishing leaders, industry and manufacturing leaders, lost leaders, trial leaders, biography of world leaders, newspapers, or the like. Accordingly, the company would be paying for impressions on users who are outside the desired audience. The result is a low "click-through" rate due to inappropriate targeting and/or qualification of the user. In contrast, using thematic matching techniques, the company would be paying for impressions on users who are within the desired audience, based upon similarity of themes.

In various embodiments of the present invention, the messages or content provided by sponsors may be of any form, such as the sponsor logo; audio and/or video data; text messages (e.g. advertisements, real-time stock quotes, news stories, sports scores, weather conditions, air fares, or other information); games, shockwave or flash data, and the like. Accordingly, the term "messages" can be interpreted broadly herein.

In various embodiments, sponsorship messages or content may be provided to the user in cases when the user is viewing data from a local computer or local area network, or outside of the LAN (e.g. the Internet). Further, the reach of sponsorship messages do not rely upon the user navigating to specific web pages, such as Yahoo.com, or using specific search web pages, such as Google.com. Accordingly, the delivery of sponsorship messages to more and better qualified/more users is believed to be achieved with embodiments of the present invention.

Additionally, various embodiments of the present invention are not limited to web searching embodiments. Some embodiments may be applications running upon a end-user's desktop or the like, and may be accept as input from any number of sources. For example, a user may use a word processor to draft a patent application, but may be concerned about prior art. In such an example, the user may highlight one or more sentences in the word processor that describe the technology. In response, embodiments of the present invention receive the highlighted passages, identify relevant themes of the passages, and based upon these themes, embodiments may identify documents on the user's desktop, a network drive, on the Internet, or the like that have similar themes.

The above sequence of steps provides a method according to an embodiment of the present invention. As shown, the method uses a combination of steps including a way of processing information objects using a thematic based approach. Other alternatives can also be provided where steps are added, one or more steps are removed, or one or more steps are provided in a different sequence without departing from the scope of the claims herein.

FIGS. 11-15 illustrate additional graphical user interfaces according to embodiments of the present invention. In particular, FIGS. 11-15 show a graphical representation of themes prioritized for a specific user task and in response to user significance input. These interfaces may be presented with or instead of the list illustrated in the task pane, above.

Figure 11:
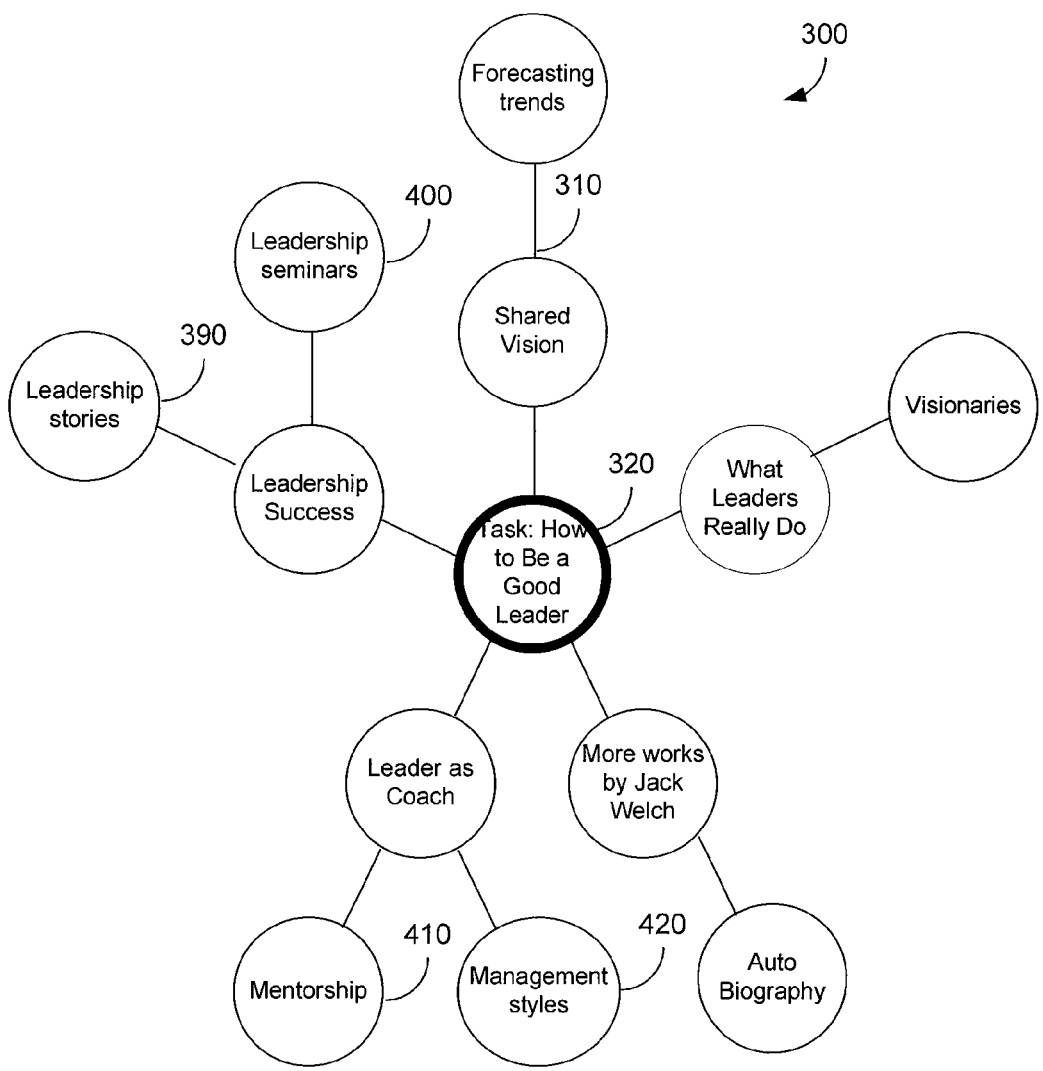
FIGS. 11-15 illustrate examples of graphical user interfaces according to embodiments of the present invention.

In FIG. 11, the user task is illustrated to be finding additional data sources that provide interesting information to the user. As illustrated in this example, nodes 300 represent related themes that are interconnected as shown. In this example, the distances 310 of the connections between nodes may be the same. As will be seen below, in various embodiments, the distances represent conceptual distances, or closeness of the themes or data sources, to what themes the user finds "interesting." In FIG. 11, the closeness or relevance of themes to a central node 320 may be prioritized in a number of ways or not prioritized.

Figure 12A:
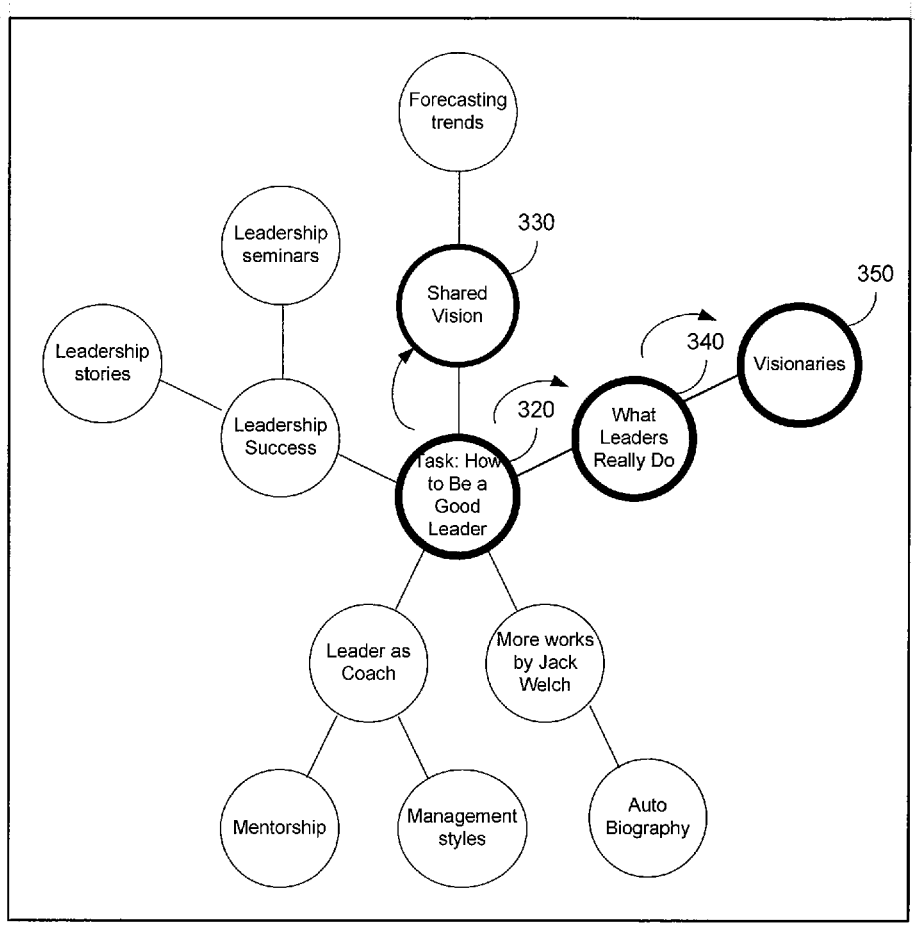

In FIG. 12A, the user has navigated, via direct click of a node, or the like, to the "Shared vision" node 330, which represents one or more data sources. In the various embodiments, the user may then switch to the GUI illustrated in FIG. 10 to view a list of data sources including data sources 230, 240, or the like. Additionally, in this example, the user has selected the "What Leaders Really Do" theme node 340, and also selected a related "Visionaries" theme node 350.

Figure 12B:
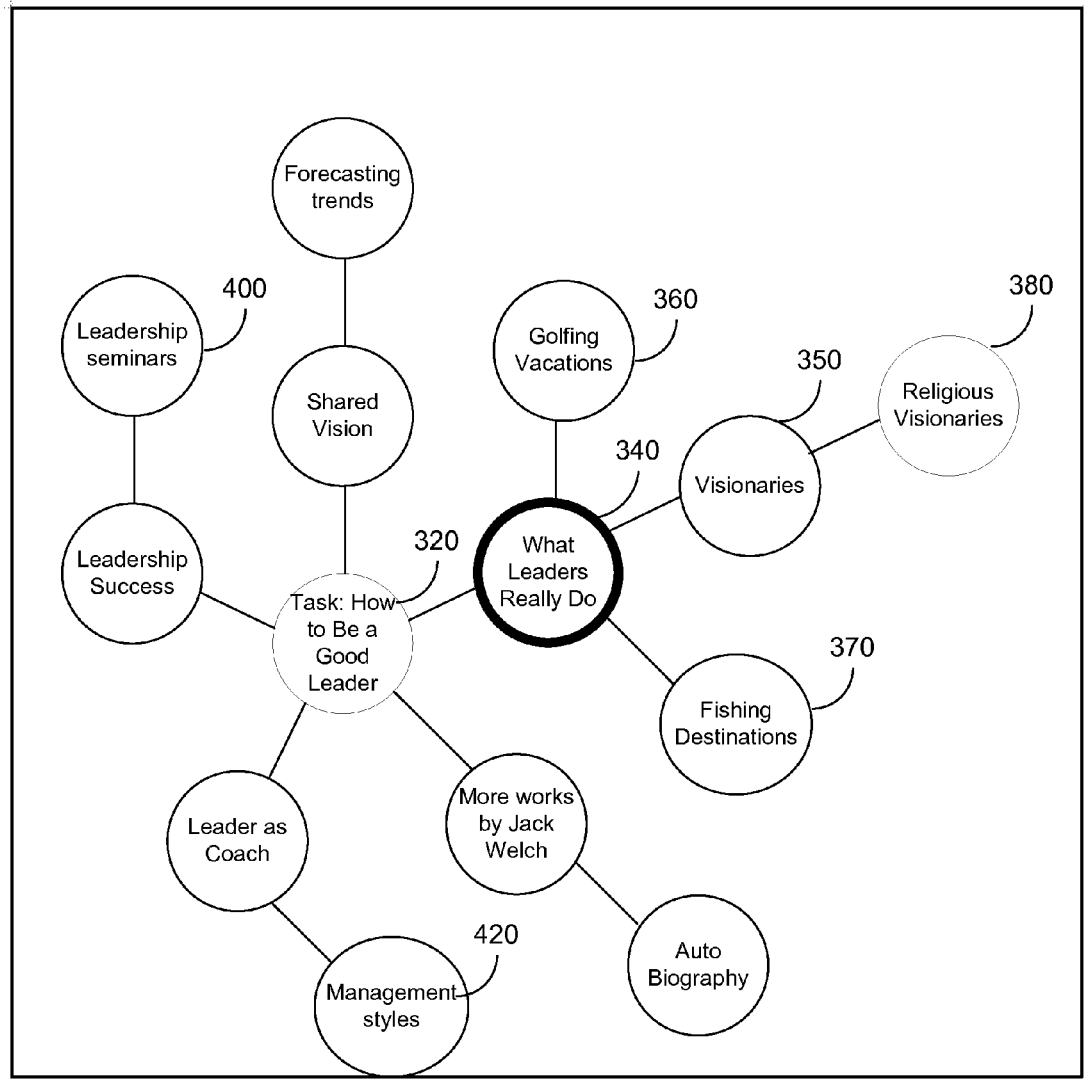
Figure 12C:
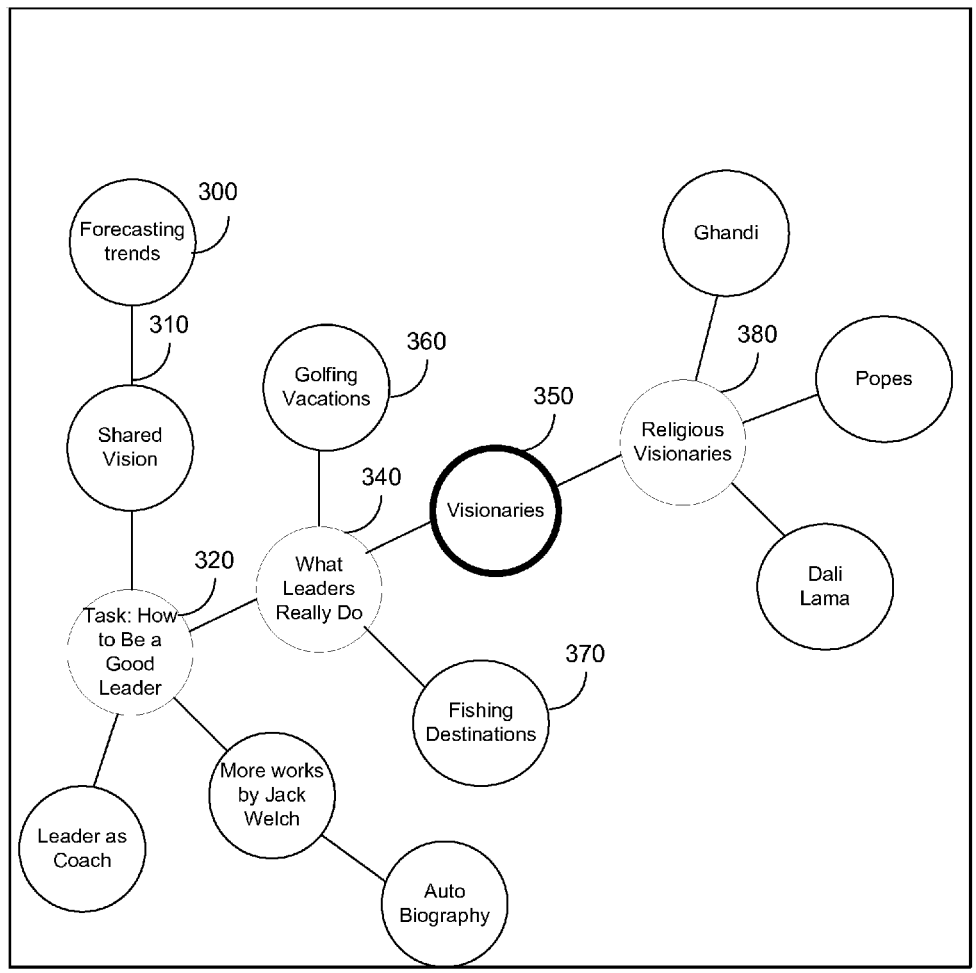
Figure 12D:
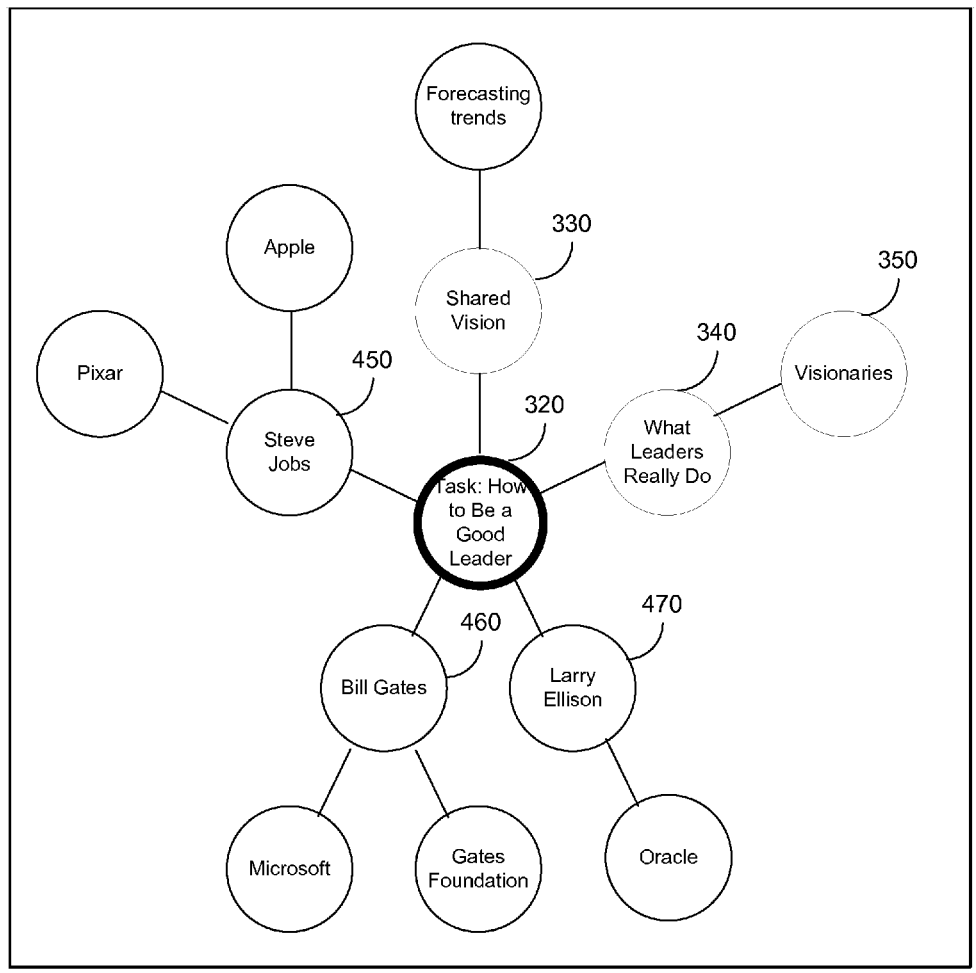

As illustrated in FIGS. 12B-D, in various embodiments, as the user selects various nodes, such as node 340 and 350, additional closely related themes to these nodes may appear on the display. For example, nodes 360 and 370 representing themes closely related to node 340 may appear, and node 380 closely related to node 350 may also appear. Additionally, distant nodes, such as nodes 390-420 in FIG. 11 may disappear from the display as being more remote (i.e. less thematically similar) from the currently selected node or as being outside the display window.

In various embodiments, in addition to having new nodes appear and older nodes disappear, the currently selected node may automatically be centered on the display. As illustrated in FIG. 12B, on a display 430, node 340 is initially centered, and in FIG. 12C, on a display 440, node 350 is centered when selected.

As shown in FIG. 12D, the user has explicitly or implicitly user-rated data sources and/or themes that are more "interesting" to the user when navigating to nodes 330, 340, and 350, in FIG. 12A. For example, the user may have stated that the theme in node 330 is relevant to her task, but themes in nodes 340 and 350 are more interesting. As a result, if and when the user navigates back to node 320, the themes presented to the user may change based upon her relevance input. In the example in FIG. 12D, the themes identified for the task change in comparison to FIG. 12A have changed. As illustrated, a "Steve Jobs" theme, node 450, a "Bill Gates" theme, node 460, and a "Larry Ellison" theme, node 470, are now determined to be more interesting to the user, based upon the user's ratings.

In various embodiments, the user may then select the "Bill Gates" theme, node 460, and view one or more data sources under that theme, as illustrated above. In various embodiments, the user may switch back and forth to and from the list form of display to view the reprioritized themes, as was shown in FIG. 10.

Figure 13:
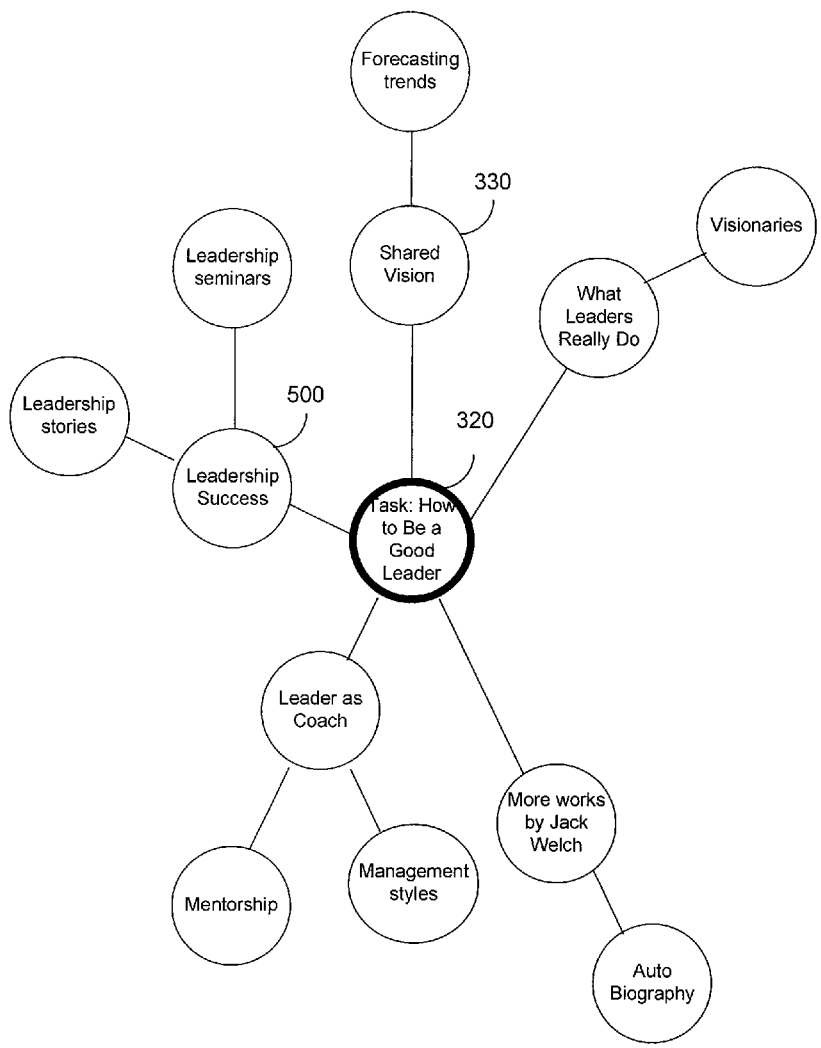

FIG. 13 illustrates another example of a graphical user interface. More specifically, FIG. 13 illustrates the belief state illustrated in FIG. 11, but in contrast to the connections being the same length, the length of the connections may vary according to the adjudged relevance or closeness of the themes presented to the selected node, e.g. node 320. In this example, a system may set an initial belief state of the theme "How to be a good leader" theme, node 320, as being more closely related to the "leadership success" theme, node 500, than the "shared vision" theme, node 330.

Figure 14:
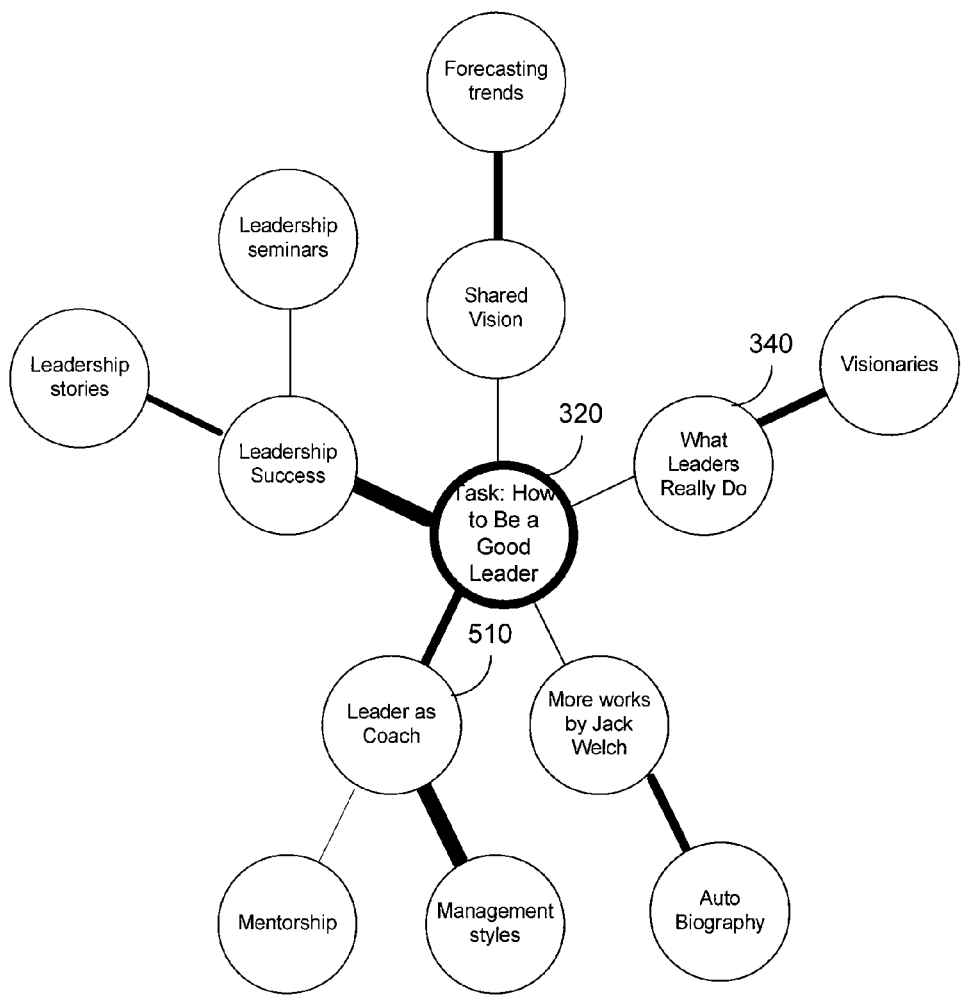

FIG. 14 illustrates another example of a graphical user interface. More specifically, FIG. 14 illustrates the belief state illustrated in FIG. 11, but in contrast to the connections being the same appearance, the weight of the connections may vary according to the relevance or closeness of the themes presented with regards to the selected node, e.g. node 320. In this example, again, the theme "How to be a good leader," node 510, is more closely related to the "leader as a coach" theme, node 510, than the "What leaders really do" theme, node 340.

Figure 15:
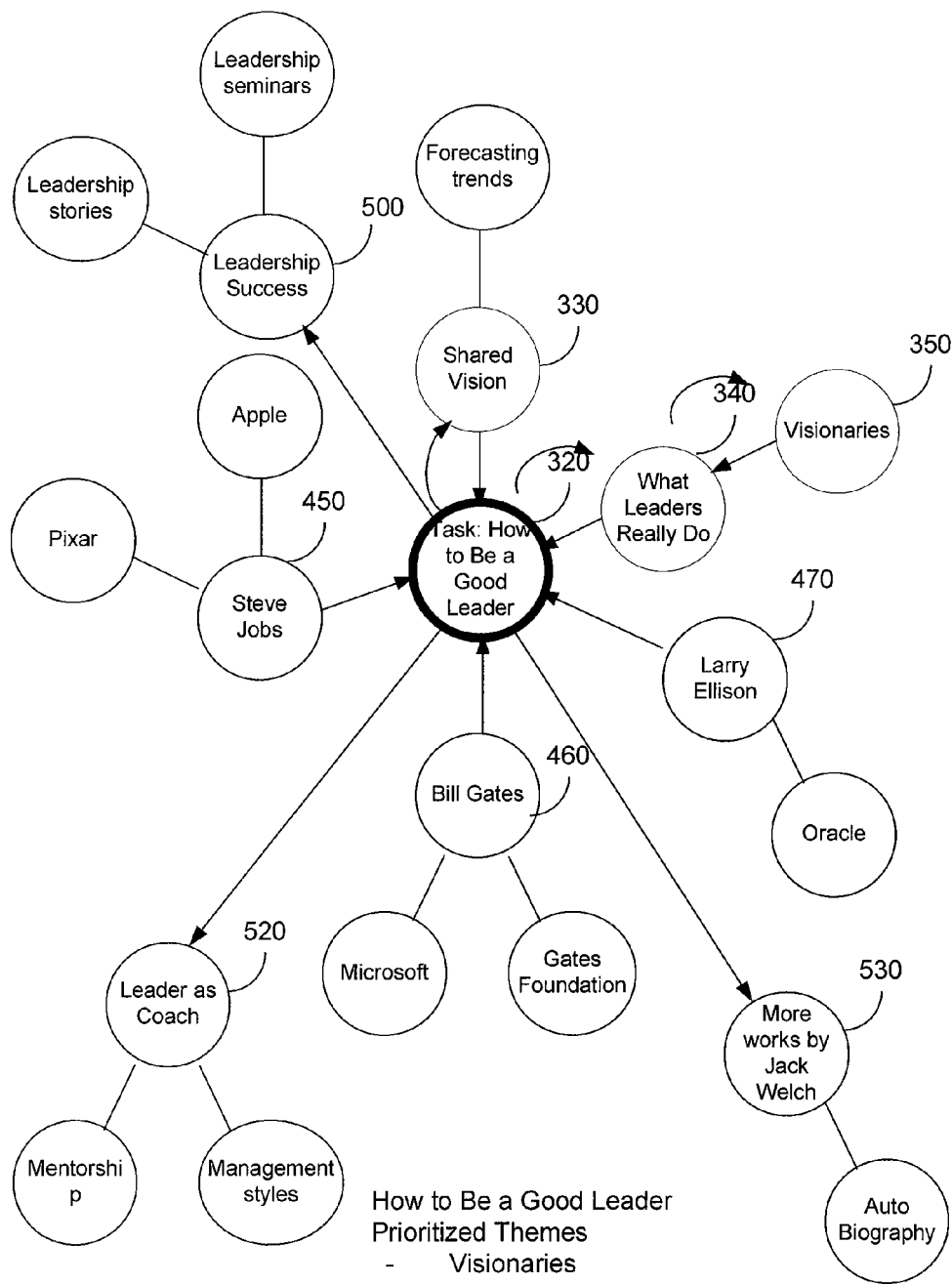

FIG. 15 illustrates another example of a graphical user interface. More specifically, FIG. 15 illustrates the belief state illustrated in FIG. 12A with new nodes illustrated in FIG. 12D. In this example, the length of the interconnections between nodes vary according to the relevance or closeness of the themes presented, as illustrated in FIG. 13. In this example, arrows are shown to illustrate how nodes move in or out in FIG. 12D after being considered relevant to the user, compared to an initial state in FIG. 11. As can be seen in this example, nodes 330, 340 and 350 are drawn closer to node 320, and new nodes 450, 460 and 470 are presented and drawn close to node 320. Additionally, nodes 500, 520, and 530 are illustrated further away from node 320, to indicate these themes are considered less relevant to the user's task. In other embodiments of the present invention, the techniques illustrated in FIG. 14 may also be used or used exclusively. In light of the present patent disclosure, one of ordinary skill in the art will now recognize that many other methods for illustrating closeness or relevance can also be used.

These graphical user interface embodiments discussed above visually illustrate to the user, themes that may be similar to what the user is interested in. As can be seen, in the above examples, although the user may initially be interested in finding out more about "How to be a good leader," based upon the user's ratings of relevance of different data sources, it may turn out that the user is really more interested in learning about well-known industry leaders. Accordingly, the user may then select nodes 450, 460 and/or 470 to view data sources related to these industry leaders. Thus, as illustrated, the themes presented to the user reflect the initial belief state of the user which is then modified in response to the user determination of what she believes is significant or relevant to her task or not, i.e. a method for navigating through multiple different data sources by topic/theme.

As mentioned above, in FIG. 1, to address privacy concerns of users, a thematic extraction engine may be resident upon a user's computer system. In such embodiments, web pages, or the like, that the user wants to perform thematic matching are processed via the thematic extraction engine resident on the user's computer system. The identified themes may then be processed in a variety of ways. In one embodiment, a thematic index may also be resident upon the user's computer, or resident upon the user's intranet. Accordingly, the identified themes are locally matched with the user's computer or computer network, and web pages, or documents having similar themes are simply retrieved from the Internet, or the like. In these above embodiments, the actual web pages originally accessed by the user would not be visible from outside the user's computer. Additionally, depending upon the embodiment, the matching themes would not be visible from outside the user's computer, and/or from the Internet. In another embodiment, the identified themes are used search a centralized thematic index. In such embodiments, the actual web pages originally accessed by the user would again not be visible from outside the user's computer.

Figure 16:
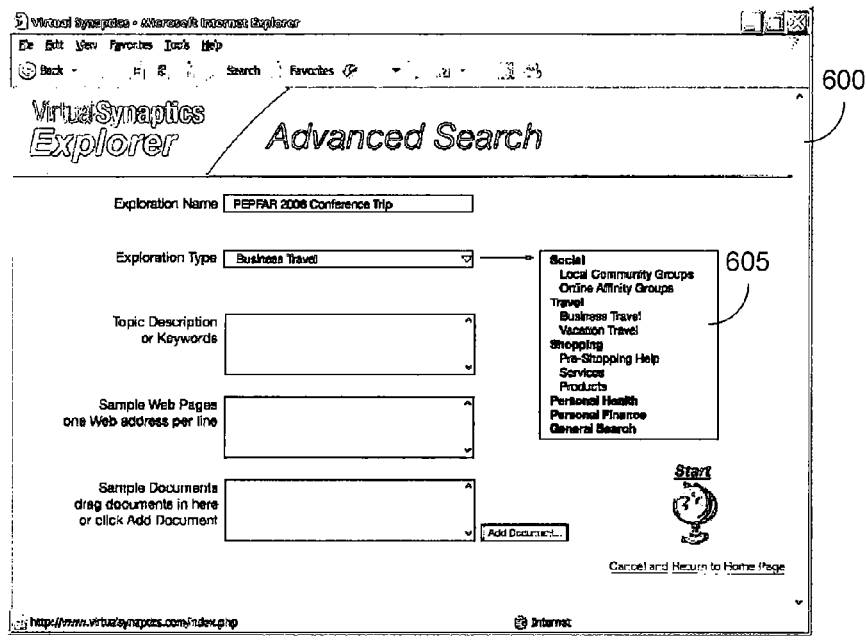
FIGS. 16, 17A-B illustrate examples of graphical user interfaces according to embodiments of the present invention.

FIG. 16 illustrates a graphical user interfaces according to embodiments of the present invention. As can be seen, FIG. 16 illustrates a consumer-level user interface 600 that allows a user to make a selection of a consumer-level tasks 605. As can be seen, data from any number of sources may be used as the source input. For example, the user may enter key words, URLs of web pages that are important, documents of relevant material, and the like.

Figure 17A:
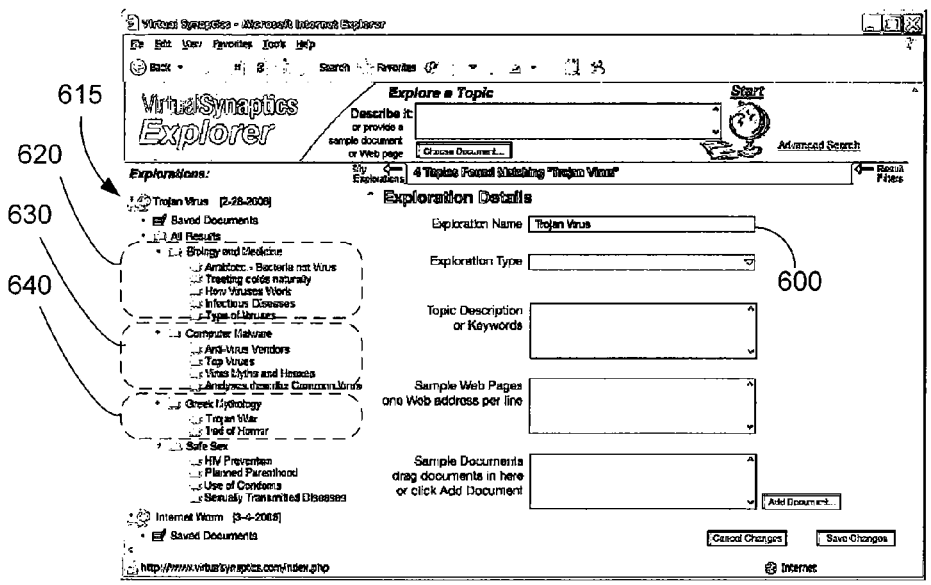
Figure 17B:
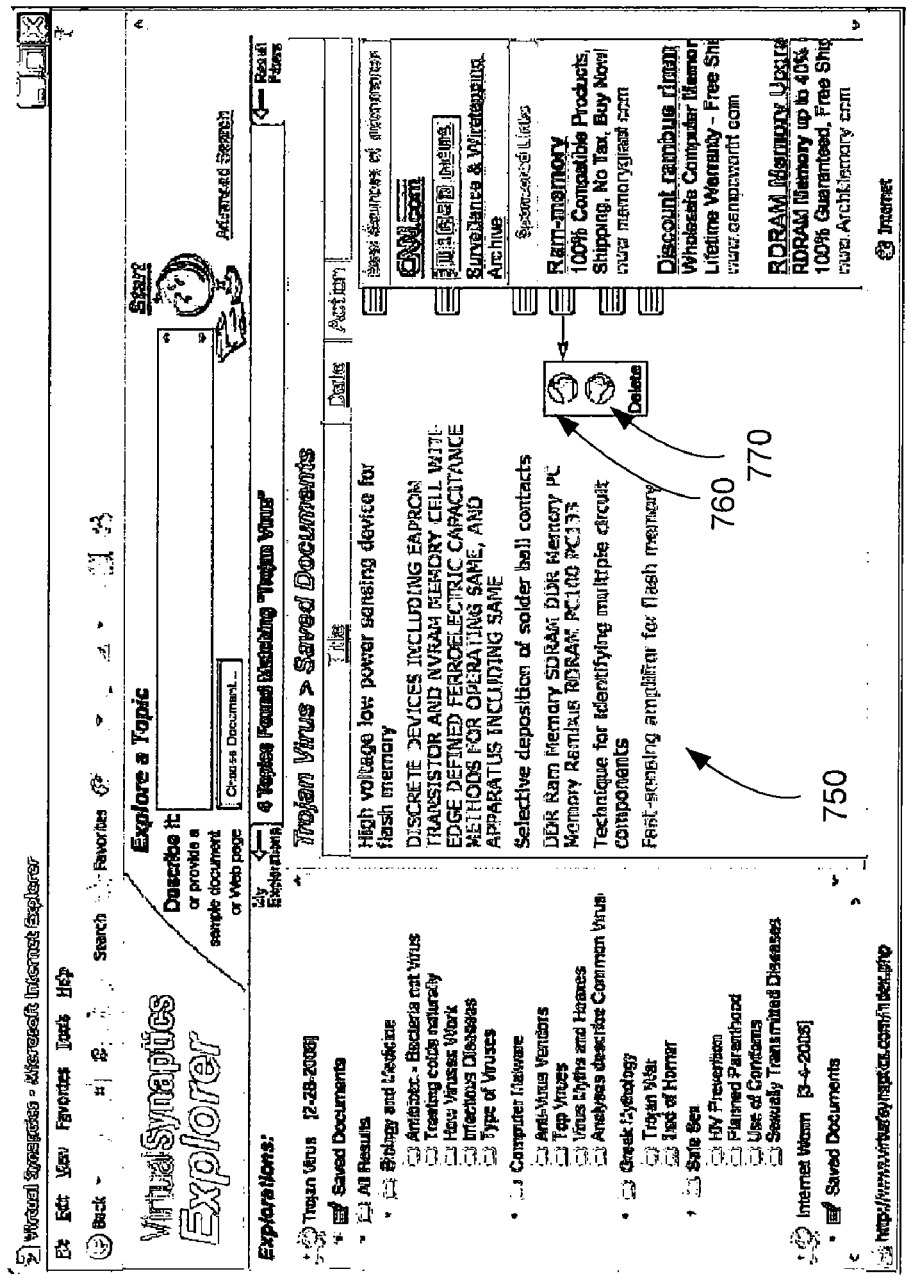

FIGS. 17A-B illustrates additional graphical user interfaces according to embodiments of the present invention. In the example in FIG. 17A, the user has provided any number of documents, URLs, or the like to the system, for a task named "Trojan Virus". In response to the input "documents," a topic list 615 is returned. As can be seen, topic list 615 includes topics related to biology, 620, computers, 630, Greek mythology, 640, and the like.

In the example in FIG. 17B, the user has selected upon the topic list computers 630 for further exploration. As illustrated, a list of relevant "documents" may appear in window 750. From this list of documents, a user may review one or more documents. If the user believes the document is relevant, the user may select icon 760, or if the user believes the document is irrelevant, the user may select icon 770.

In response to this type of user feedback, as described above, the belief state for the user is modified. Accordingly, the list of prioritized topics (themes) may be adjusted accordingly. In various embodiments, default feedback may be assigned, so that unless the user specifically rates a document, the default feedback is used. For example, only a thumbs-up button may be provided in some embodiments. In such cases, unless the user gives a thumbs-up on a document, themes of the document are lowered for the user's belief state.

FIG. 18 is a block diagram of typical computer system 800 according to an embodiment of the present invention.

In the present embodiment, computer system 800 typically includes a monitor 810, computer 820, a keyboard 830, a user input device 840, computer interfaces 850, and the like.

In the present embodiment, user input device 840 is typically embodied as a computer mouse, a trackball, a track pad, a joystick, wireless remote, drawing tablet, voice command system, eye tracking system, and the like. User input device 840 typically allows a user to select objects, icons, text and the like that appear on the monitor 810 via a command such as a click of a button or the like.

Embodiments of computer interfaces 850 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 850 may be physically integrated on the motherboard of computer 120, may be a software program, such as soft DSL, or the like.

In various embodiments, computer 820 typically includes familiar computer components such as a processor 860, and memory storage devices, such as a random access memory (RAM) 870, disk drives 880, and system bus 890 interconnecting the above components.

In one embodiment, computer 820 includes one or more microprocessors from Intel. Further, in the present embodiment, computer 820 typically includes a Windows-based operating system from Microsoft Corporation.

RAM 870 and disk drive 880 are examples of tangible media configured to store data such as data sources, embodiments of thematic extraction engines, thematic indices, application programs, embodiments of the present invention in the form of computer-executable code, and the like. The data stored may be in the form of computer-readable code, human-readable code, or the like. Other types of tangible media include internal storage or distribution media, such as floppy disks, removable hard disks, optical storage media such as CD-ROMS, DVDs, holographic memory, and bar codes, semiconductor memories such as flash memories, read-only-memories (ROMS), battery-backed volatile memories, networked storage devices, and the like.

In the present embodiment, computer system 800 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 18 is representative of a computer system capable of embodying the present invention. It will be readily apparent to one of ordinary skill in the art that many other hardware and software configurations are suitable for use with the present invention. For example, the computer may be an end-user desktop or portable; a network storage server configured in a rack-mounted or stand-alone configuration; a centralized server; or the like. Additionally, the computer may be a series of networked computers. Further, the use of microprocessors such as the Pentium™ or Core™ microprocessors; Opteron™ or AthlonXP™ microprocessors from Advanced Micro Devices, Inc; G4 or G5 microprocessors from IBM; and the like are contemplated. Further, other types of operating systems are contemplated, such as Windows®, WindowsXP®, WindowsVista®, or the like from Microsoft Corporation, Solaris from Sun Microsystems, LINUX, UNIX, and the like. In still other embodiments, the techniques described above may be implemented upon a chip or an auxiliary processing board (e.g. graphics processor unit).

Figure 19:
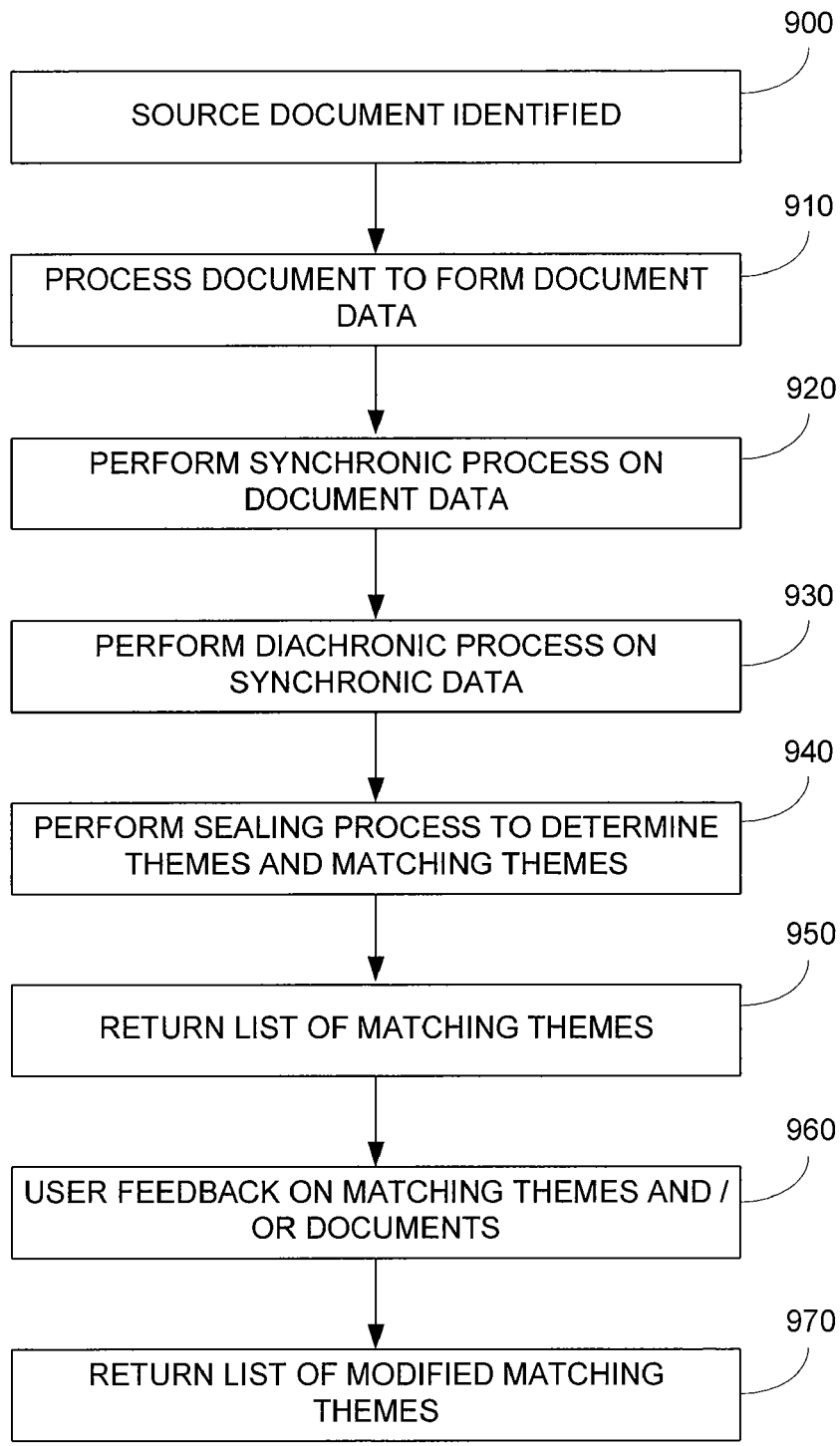
FIG. 19 illustrates a process according to an embodiment of the present invention.

FIG. 19 illustrates a flow chart according to one embodiment of the present invention. Specifically, FIG. 19 illustrates a process for determining themes from an input "document" and determining other "documents" from a thematic index that have similar themes.

Initially, a source document is identified, step 900. As disclosed above, many and multiple types of data sources may be used, such as key words, search results, web pages, textual documents, closed-captioning, and the like. In various embodiments, the data input is then processed to form unformatted text useful for subsequent steps, step 910. Types of processing may include identifying the type of input (e.g. words, fragments, sentences, etc.); parsing the types of input into semantic classes; determining contextual and non-contextual relationships; and building representations of the data, such as building data trees, identifying hierarchical interpretants (e.g. ideas classes), contextual interpretants (e.g. concepts), and themes (e.g. topics); etc.

In various embodiments, a series of steps are then taken to determine a Semiotic value for the input data. In such embodiments, codifying the signification of input is based on a three phase/pass process of identifying relationships that establish semiotic "value," as per Claude Levi-Strauss' semilogical principle. This principle is that semiotic value is obtained when dissimilar things can be exchanged or similar things can be compared. Further, the premise includes that meaning can be reduced to the relationship between signs which ultimately establishes semiotic value (i.e. a syntagma can be compared with another syntagma and exchanged for a higher order concept or idea). Generally, the process may involve codifying value into a numeric system, and manipulating it mathematically in order to identify concepts and establish relevancy/similarity with other concepts. In this way, the concepts engendered by signifiers and their relationships to larger systems can be determined without first gaining a traditional "understanding" of the expressions of thought being conveyed/analyzed.

The three phases/passes employed in various embodiments are described below to include a: synchronic phase, a diachronic phase, and a "sealing" phase. Generally, embodiments capture two primary types of relationships; relationships of substitutability and syntagmatic relationships. Relationships of substitutability are established synchronically (during Pass 1—the synchronic phase of the analysis) and syntagmatic relationships are identified diachronically (during pass 2 and 3—the diachronic and sealing phases).

In various embodiments, Synchronically is a construction that takes place in terms of "key" or "Master" signifiers that have meaning established outside the discourse. Additionally, Diachronically is as a sentence, syntagma, or piece of a discourse on folds, each sign will modify the signs which preceded them thus retroactively constructing and "sealing" their meaning.

In step 920, a synchronic process phase is performed. In various embodiments, literal and Paradigmatic relations are typically established. This phase is typically concerned with identification and signification of the potential denotations of key signifiers (ignoring any antecedents). In this phase, literal and Paradigmatic relations are established. In some embodiments, the synchronic phase is concerned with identification and signification of the potential denotations of key signifiers (ignoring any antecedents). The denotations are codified in semantic classes in a semiotic knowledge base and are used to identify the literal and paradigmatic relations possible in the local system subordinate to the higher principle of organization of connotations. Once resolved, the denotative semantic classes can be used to identify possible connotations (during the diachronic phase). The denotations are codified in semantic classes in a semiotic knowledge base and are used to identify the literal and paradigmatic relations possible in the local system subordinate to the higher principle of organization of connotations. Once resolved, the denotative semantic classes can be used to identify possible connotations (during the diachronic phase).

In various embodiments, a purpose of this step is not to complete the signification, but, rather to identify and record the key signifiers. Key signifiers are recorded in terms of their possible literal and paradigmatic denotations. In various embodiments, the system utilizes two types of denotative semantic classes differentiated by their content—i.e. those containing—linearly substitutable interpretants (i.e. literal translations) and paradigmatically substitutable interpretants (i.e. related denotations of syntagmas—for example, cat, feline, etc., metaphors, euphemisms, etc.). It is believed that one of ordinary skill in the art will understand these concepts and understand how to implement such systems.

In step 930, a diachronic phase is performed to establish syntagmatic relations. In various embodiments, connotations are established and codified. Syntagmatic relations represent the signification of a locally ordered collection of signs (e.g. a sentence, phrase, fragment, etc.). Rather than attempting to perform true signification (which by necessity would require individual inference), syntagmatic relations are resolved to potential connotations. These potential connotations are typically codified in a manner that allows for the identification and comparisons of similar/related connotations.

In various embodiments, the diachronic step identifies syntagmatic relations that establishes context which in turn indicate specific connotations. Thus, it is in this step that context is established and codified. As such, it is important to establish whether or not enough relational grammar (subject/action primitives obey basic syntactic operations) and generative grammar (sentence structure follows grammatical rules) exists in the input for the system to identify any meaningful context and subsequently extract from it useful connotations. In various embodiments, the system does this by analyzing the results of the synchronic pass. Thus the determination of context does not require the original text of the discourse. It is somewhat ironic that the denotative (synchronic) pass, which is not involved in identifying context, is the only pass that actually parses the original text (the actual source of contextual information).

In various embodiments, syntagmatic relations are later established through diachronic semiosis; the retroactive "sealing" of sense. (In the sealing phase, step 940, (3rd pass) of the process, both the syntagmatic and paradigmatic relations are sealed by discarding other possible relationships that do not support the possible connotations identified.) In various embodiments, the system may utilize two types of syntagmatic relations (each identified through different methods and distinguished by their lack of and inclusion of context respectively): hierarchical (context-free connotations) and thematic (context based connotations).

In various embodiments, hierarchical interpretants ("Ideas") are an organization of unlimited semiosis where interpretants produce further signs to signify greater specificity or to resolve ambiguities. Hierarchical interpretants represent a set of ideas established a priori from larger systems or groups of systems (societal, domain specific, etc.). By virtue of their a priori nature, hierarchical interpretants are context-free/contextless in that they relate to and are based on rules that describe a semiotic "value" for a series of syntagmas without reference to elements outside of the syntagmas themselves (i.e. without regard to the interrelated conditions in which some set of syntagmas exists or occur within a specific discourse). In some embodiments, the Hierarchical interpretants are used to identify possible connotations (suggest meaning apart from or beyond what the syntagmas explicitly name, represent, or describes). Once the possible connotations are established, the previously identified possible denotations can be sealed by discarding denotations that do not support the identified connotations (i.e. are not included as classes in the groups of hierarchical interpretants (ideas nodes).

In various embodiments, conceptual interpretants (Concepts) are auto-emergent contextual relationships that represent the fundamental unit of context maintained by the system. Concepts are identified by establishing collections of relationships. Again in various embodiments, the auto-emergent relationships are based upon relevance to the user's task, as signified by the user (e.g. thumbs down).

In step 940, a Sealing Phase is performed that provides a retroactive establishment of "sense" to the topics. In various embodiments, the system performs sealing of "sense" both synchronically and diachronically. The synchronic resolution may be performed in terms of "key" or "master" signifiers that have meaning outside of the discourse. Additionally, the diachronic resolution may be established as the sentence, syntagma, or thematic unit of a discourse is analyzed and each newly identified sign is used to modify the signs which preceded it. This process retroactively "seals" the meaning of previously identified syntagmas by discarding connotations and denotations that do not support the evolving understanding of "sense."

In various embodiment, the following process may be used to perform the "sealing" step and the topic identifying step (step 950):

1. Use the hierarchical connotations (ideas) to seal denotations in Potential Denotative Class lists by:

a. Walking through the trees to identify hierarchical interpretants (semantic classes that identified ideas nodes), and b. For each potential Denotative Class lists that contain a matching hierarchical interpretant: Discard all semantic classes from the Potential Denotative Class list that do not represent the matching hierarchical interpretant;

2. Use the culmination of denotations to further seal the remaining denotations Potential Denotative Class lists:

a. For all remaining Potential Denotative Class list entries that contain the same paradigmatic class(es) as other Potential Denotative Class lists, discard all other syntagmatic and paradigmatic classes from each class list (i.e. as was done for up-weighting);

3. Resort the semantic classes descending in frequency order and dividing the ordered list into class frequency quartiles;

4. Find and extract the Concepts within the discourse.

Concepts are established by a combination of contextual relations and semantic class frequency. In various embodiments, each concept is represented by a bitmask containing 128 bits. The 128 bits in each Concept mask are organized into 4 DWORDs. The first 2 DWORDs represent relations (references in context) with the top 2 quartiles (most significant) semantic classes used in the Concepts. Contextual relations are then established by comparing the number of bits that are associated (same bits set) in two or more Concepts.

a. For all sentences, find potential Conceptual Interpretants (see Identifying Concepts). Note that this does not require the original text (only the results from the pass 1 and pass 2);

b. Codify the Concepts into thematic bitmasks where the most frequently occurring semantic classes (first 128 semantic classes in the aforementioned frequency ordered semantic class list) assume the first bit positions (i.e. the most frequently used semantic class is bit 0, the next most frequently used class is bit 1, etc.) in the Concept bitmasks. Each semantic class found in the Concept is indicated by marking its associated bit in the mask with a 1;

c. Concept significance is established by semantic class frequency (i.e. the most significant Concepts are those that refer to the most frequently used semantic classes). Since the bits in the Concept bitmask are organized in descending order, bit 0 represents the most frequently occurring semantic class, bit 1 the next most frequently occurring class, etc. Thus, Concepts can be organized by significance by simply comparing the bits set from right to left. (pre-ordering Concepts by significance is may be used to improve performance by allowing for a reduction in the number of Concepts used in scoring); and d. Once all sentences have been processed and all Concepts discovered, discard the sentence numbers; and 5. Identify topics and order the Concepts in descending significance, step 950.

a. Topic significance is established by a combination of contextual relations and semantic class frequency. The 128 bits in each Concept mask are organized into 4 DWORDs with the first 2 DWORDs representing relations (references in context) with the top 2 quartiles (most significant) semantic classes used in the Concepts. Contextual relations are established by comparing the number of bits that are associated in two or more Concepts;

b. Logically, perform a bitwise AND of each Concept (this is actually better done by shifting the bits and comparing the carry bits) and sort the Concepts based on the number of overlapping bits. In various embodiments, ties are sorted by making the Concepts with more significant semantic classes (more lower number bits set) the most significant. For example, if two Concepts refer to the same 4 semantic classes, the Concept with the most significant semantic class is the most significant; and c. Record the top X number or percentage of topics. Note that a single Concept may be included in more than one topic. In various embodiments, the top 5 topics may be used to organize the discourse into topic categories (now called Concepts) when presenting search results to the user. (Recording more topics may allow for topic level scoring to enhance Concept level scoring (reduce the number of Concepts used or add additional score) or replace Concept level scoring altogether);

6. Normalize the frequencies of the semantic classes by summing all the frequencies and dividing each individual frequency by the sum (i.e. the total number of uses of all classes); and 7. Extract Most Frequent Denotation Tuple (MT)s by selecting the top X number or percentage frequency semantic classes. In various embodiments, additional information about topics and Concepts may be provided—for example, the top semantic classes from the top topics and Concepts may be provided instead of just the most frequently used classes.

In step 950, the list of topics (e.g. themes) are typically displayed to the user. As disclosed above, the user can rate themes or documents of themes to provide feedback to the system, step 960. Based upon the feedback, the themes displayed are refined, and redisplayed to the user, step 970. Examples of this are illustrated below.

Figure 20A:
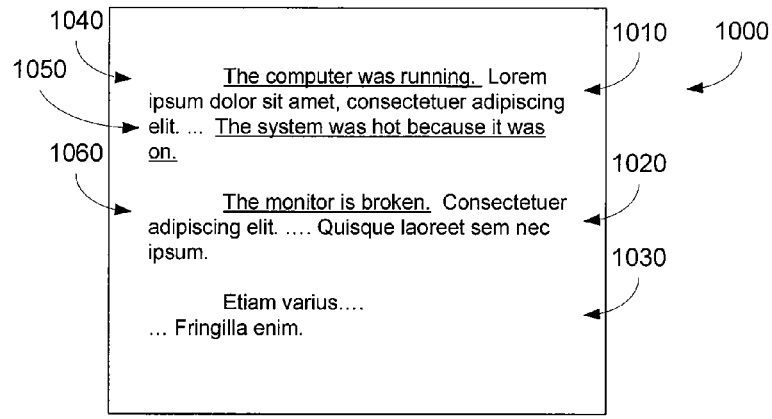
FIGS. 20A-F illustrate examples of embodiments of the present invention.

FIGS. 20A-E illustrate an example according to various embodiments of the present invention. In particular, FIGS. 20A-E illustrate a process of entering a document into a thematic index, according to various embodiments of the present invention. These Figs. also illustrate the matching of themes of an input document (a data source) to data from a thematic index. FIG. 20A illustrates a document 1000 to be indexed, for example, upon a crawl of a web site, as discussed above. As illustrated, document 1000 may include a number of paragraphs 1010, 1020, and 1030. Paragraph 1010 includes a number of sentences including sentence 1040: "The computer was running", and sentence 1050: "The system was hot because it was on." Additionally, paragraph 1020 includes a sentence 1060: "The monitor is broken."

Figure 20B:
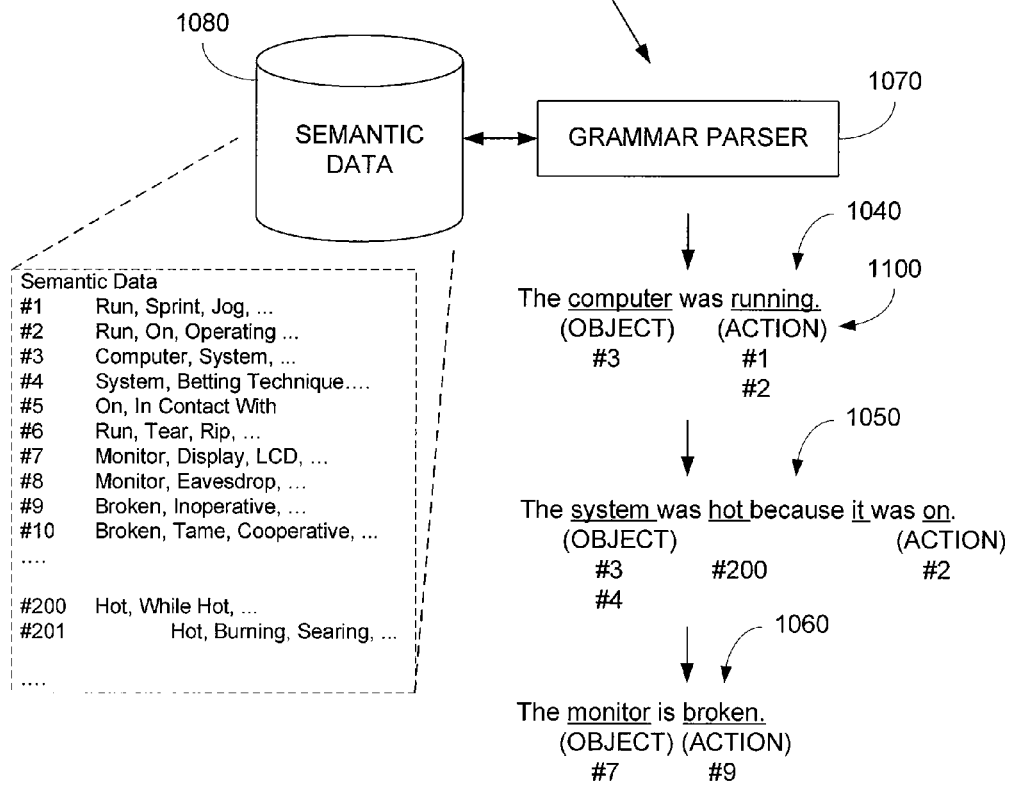

Software concepts that are used in various embodiments of the present invention to perform the synchronic process phase, step 920 are illustrated as a grammar parser 1070 and a semantic database (e.g. semiotic knowledge base) 1080 in FIG. 20B. In various embodiments, semantic database 1080 includes two types of denotative semantic classes differentiated by their content—i.e. those containing: linearly substitutable interpretants (i.e. literal translations of words) and paradigmatically substitutable interpretants (i.e. related denotations of syntagmas—for example, cat, feline, etc., metaphors, euphemisms, etc.) In this example, in semantic database 1080, a number of entries are included in this example, for words in sentence 1040. The entries in semantic database 1080 are typically uniquely numbered, as shown.

In various embodiments, using sentence 1040 as input, grammar parser 1070 can determine the term "computer" as an object, having an action "running" 1100. Then referring to semantic database 1080, a number of possible (idea classes) entries in semantic database 1080 are assigned to the words, as shown. In this example, entry (e.g. sign) #3 is possible for the word "computer" and entries (e.g. signs) #1 and #2 are possible for the word "running" In various embodiments of the present invention, the process is repeated for the next sentence. In the present example, sentence 1050 is used as input. In this example, grammar parser 1070 determines the term "system" as an object, and "it" refers to "system" in the sentence. Additionally, grammar parser 1070 determines that the term "on" is an action referring to the term "system." Again, referring to semantic database 1080, a number of possible entries in semantic database 1080 are assigned to the words, as shown. In this example, entries #3 and #4 are possible for the word "system" and entry #2 is possible for the word "on."

In various embodiments, determination of entries in semantic database 1080 may match the word entries, but should also grammatically match. It is contemplated that many other structural elements of a sentence may be identified from grammar parser 1070, than those illustrated. These other structural elements may also have identified entries in semantic database 1080. For example, entries for "hot" may be an adjective including "burning, searing;" another entry may be an adverb and include "while hot" and the like. Accordingly, entry #200 is associated. As another example, entry #5 "on" is a preposition, and "on" in entry #2 is an adjective. Thus, entry #5 is not associated with sentence 1050.

In the example illustrated in FIG. 20B, sentence 1060 is then used for input. From sentence 1060, grammar parser 1070 determines the term "monitor" as an object, having an action "broken". Then referring to semantic database 1080, a number of possible entries in semantic database 1080 are assigned to the words, as shown. In this example, entry #7 is possible for the word "monitor" and entry #9 is possible for the word "broken." Entry #8 is not associated, as it refers to a verb in this example.

In various embodiments, in this phase, entries from semantic database 1080 are extracted from sentences, one at a time. Together, the identified entries, as well as their grammatical association form a concept. As can be seen, multiple concepts can be determined from an input sentence, for example. Next, themes are initially identified from groups of sentences that have overlapping entries. As an example, referring to FIG. 20B, it can be seen that entries associated with sentence 1040 overlap to some extent to entries associated with sentence 1050. More particularly, entries #2 and #3 are both identified. In this example, sentence 1060 has no overlapping entries. Accordingly, in various embodiments, sentences 1040 and 1050 are grouped together as a theme, and sentence 1060 is associated with a separate theme. Often, themes correspond to a paragraph in a document, however, this is not necessarily so. For example, a paragraph may have multiple themes, and several paragraphs can have a single theme. As will be illustrated, themes are typically subsets of the concepts derived from more than one sentence.

In various embodiments, the amount of overlap or non-overlap need not be complete, for example, any threshold of overlapping entries can be used. As an example, when sentences have overlapping entries less than 10%, in some embodiments, the sentences may be associated with different themes, when sentences have 50% or greater overlap, the sentences may be considered to be associated with a common themes. Other percentages of thresholds may also be used in other embodiments.

In various embodiments, the inventors consider breaking-down a document, or other text input into multiple themes advantageous. This is so that specific portions of documents can be identified as having a relevant theme, as described above. For example, it would be tedious to manually review a large corporate annual report for a specific theme.

Figure 20C:
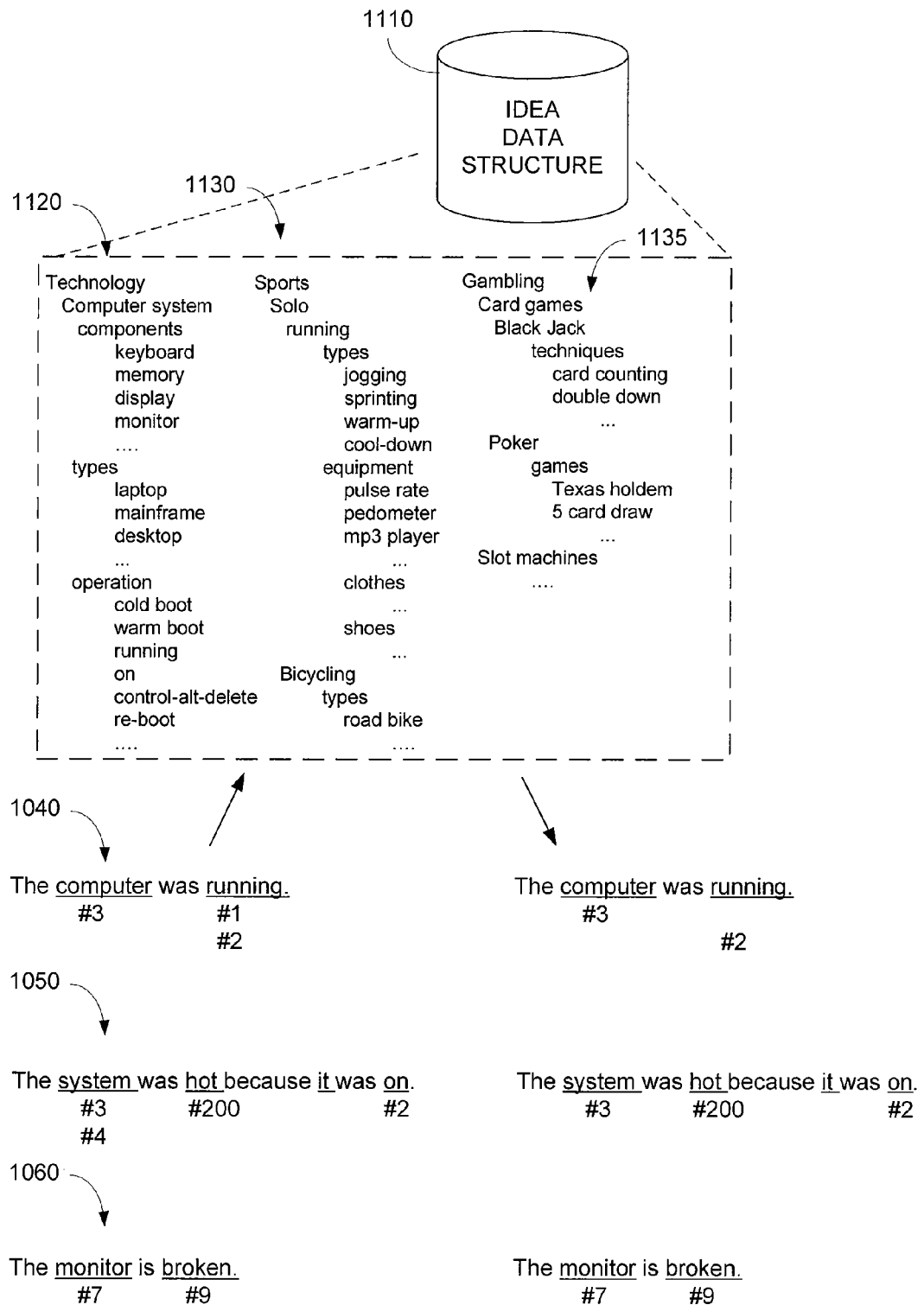

Next, in FIG. 20C, the diachronic process of step 930 and sealing process of step 940 are illustrated. In this example, an idea (concept) data structure 1110 is provided including a "thin" structure. In other words, idea data structure (e.g. ideas ontology/taxonomy) 1110 are not definitions, but simply a series of words that often go together. In various embodiments, idea data structure 1110 is typically determined to give the words identified above some context. As illustrated, in a "technology" context 1120, the words "computer, "system," "run," "operation," and the like go together; in a sports context 1130, the word "run," "equipment," "shoes," appear together; and the like. In other embodiments, many other contexts may be provided in idea data structure 1110, for example, in a gambling context 1135, the words "system," and "betting technique" may also appear.

In various embodiments, as part of the diachronic process, the contexts of the words identified in the synchronic process are identified. Then, as part of the sealing process, the number of possible contexts may be reduced. In this example, for sentence 1040, entry #3 (computer, system) was identified and entries #1 (run, spring), and #2 (run, left on) were identified; and for sentence 1050, entries #3 (computer, system), and #4 (system, gambling technique) were identified, entry #200 (hot, burning, searing) and entry #2 (run, left on) were identified. Then, referring to idea data structure 1110, technology context 1120 includes many words or phrases from the identified entries (#2, #3), and sports context 1130 includes only entry #1. In light of this, technology context 1120 may be considered a more proper context for these entries. Accordingly, sentence 1040 is associated with entries #2 and #3 (eliminating entry #1), and sentence 1050 is associated with entries #2 and #3 (eliminating entry #4).

Figure 20D:
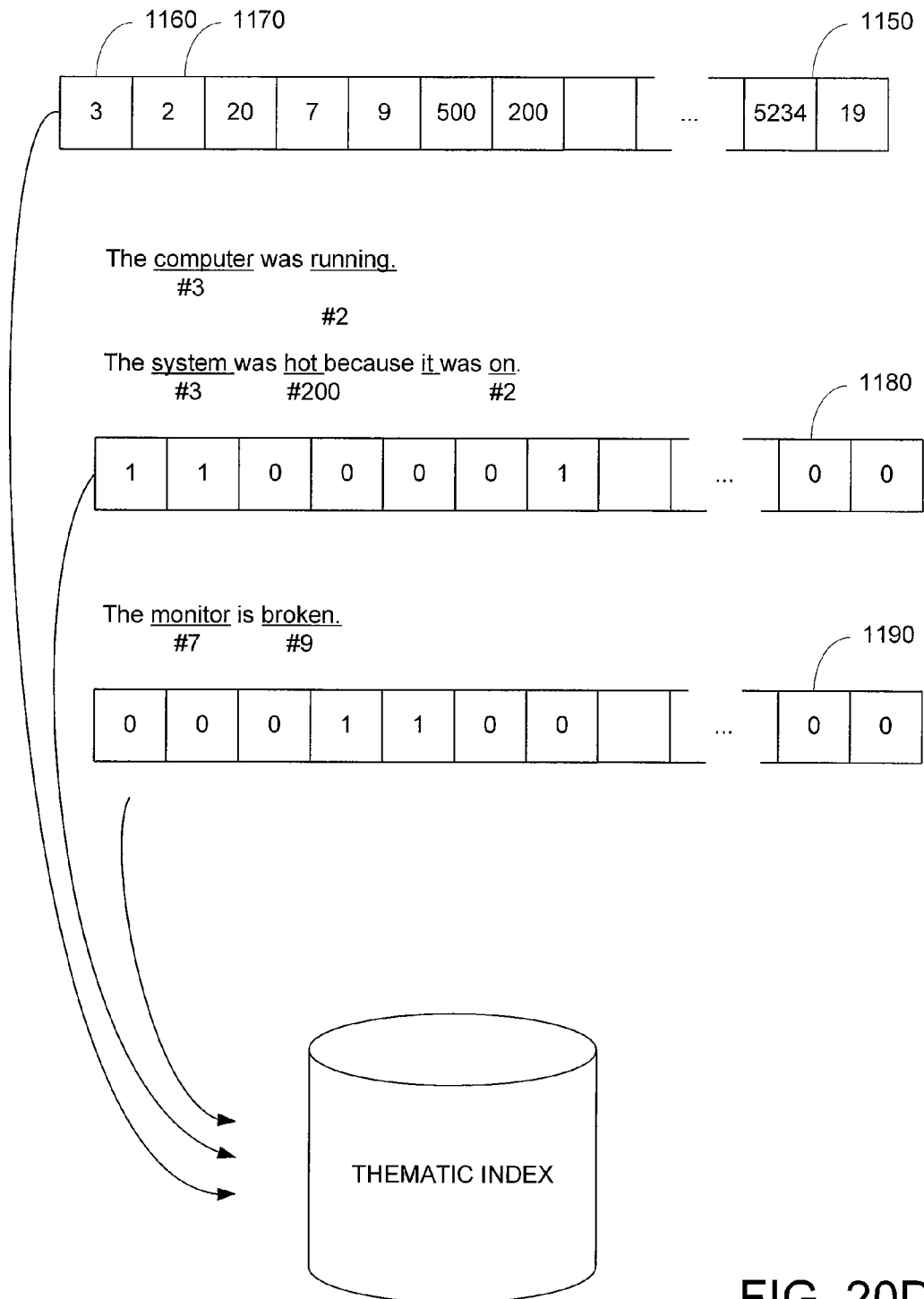

FIG. 20D illustrates an example of representing themes derived from documents. In various embodiments, the process described above is performed to determine which entries are associated with the entire document. A great number of entries may be associated with each document.

In this example, a document entry reference (e.g. a document concept reference) 1150 is determined from the entries identified from an input document (e.g. a user search input), as discussed above in FIG. 20C. In various embodiments, document entry reference 1150 includes a bit location to each entry. The bit location is typically independent of the entry number, as it may be a sparse data field. In this example, the most significant bit 1160 is assigned entry 3; bit 1170 is assigned entry 2; etc. In various embodiments, the bit location of entries may be dependent upon the number or frequency of entries identified in the document. For example, entry 3 may have been identified from the document 50 times; entry 2 may have been identified 30 times; entry 7 identified 10 times; and the like. In some embodiments of the present invention, document entry references may be limited in size, for example, to the most frequent 256 entries, or the like. Additionally, various embodiments may be applied to big endian and little endian data representations.

Next, in various embodiments, theme bit maps (bitmask) 1180 and 1190 are then determined. In various embodiments, bits are set on or off depending upon whether the theme is associated with the entries. Thus, in the present example, a single theme was identified for paragraph 1010, and as illustrated above, entries #2 and #3 were identified. Accordingly, as illustrated, theme bit map 1180 include a "1" in the first two bit locations. As can be seen, "0" appears in the next four bit locations. Additionally, in the present example, themes were identified for paragraph 1020, and entries #7 and #9 may be identified. Accordingly, as illustrated, theme bit map 1190 includes a "0" in the first three bit locations, and includes a "1" in the fourth and fifth bit location.

In additional embodiments of the present invention, another parameter may be associated with each bit location, this parameter may indicate the frequency (0.0 to 1.0) of the entry within the theme or the document. In various embodiments, patterns of entries (or concepts) may be associated with each other to facilitate thematic matching. For example, entries #4, #900, #8000 may always appear adjacent to each other within the bit map when they are determined to be closely related. As an example, entries: pen cap, pen, pen nib, may be considered closely-related. In various embodiments, certain sets of entries may also have an ordering, with the certain entries (or cordered other entries). As merely an example, for one concept, the entry for kangaroo is prioritized over the entry for Joey (kangaroo baby). In still other embodiments, entries may be weighted based upon frequency, importance within an idea index, etc.

Figures 21A, 21B:
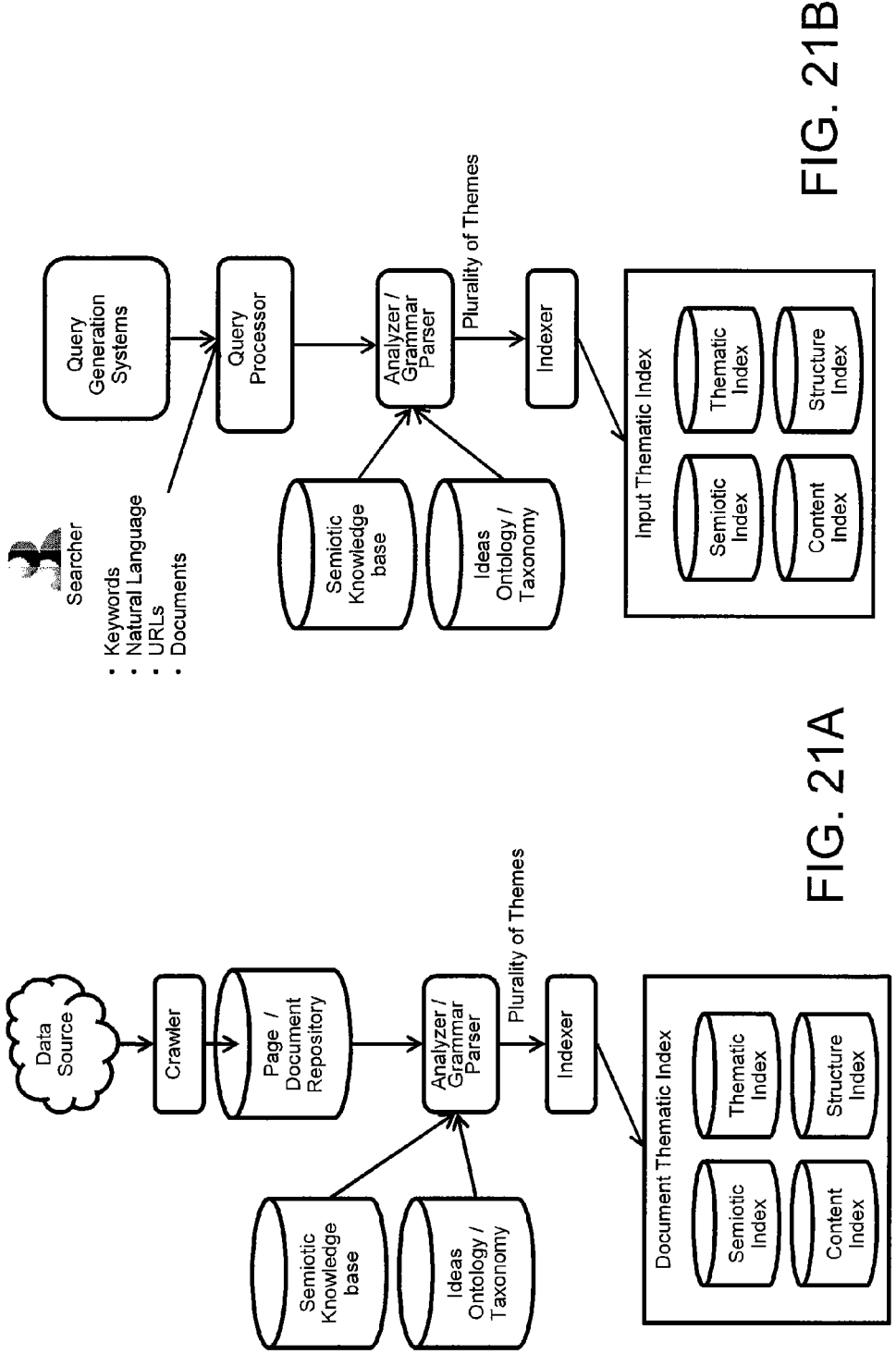
FIGS. 21A-C illustrate various embodiments of the present invention.

In various embodiments, the process above may be repeated for each theme for each document. Accordingly, when processing millions of documents, themes will be associated with each of the documents, and each theme may include a bit map, as illustrated above. The theme bit maps, and their association with documents are then stored within the thematic index (e.g. as a document thematic index), as discussed above. A more detailed block diagram of one embodiment is illustrated in FIG. 21A.

Figure 20E:
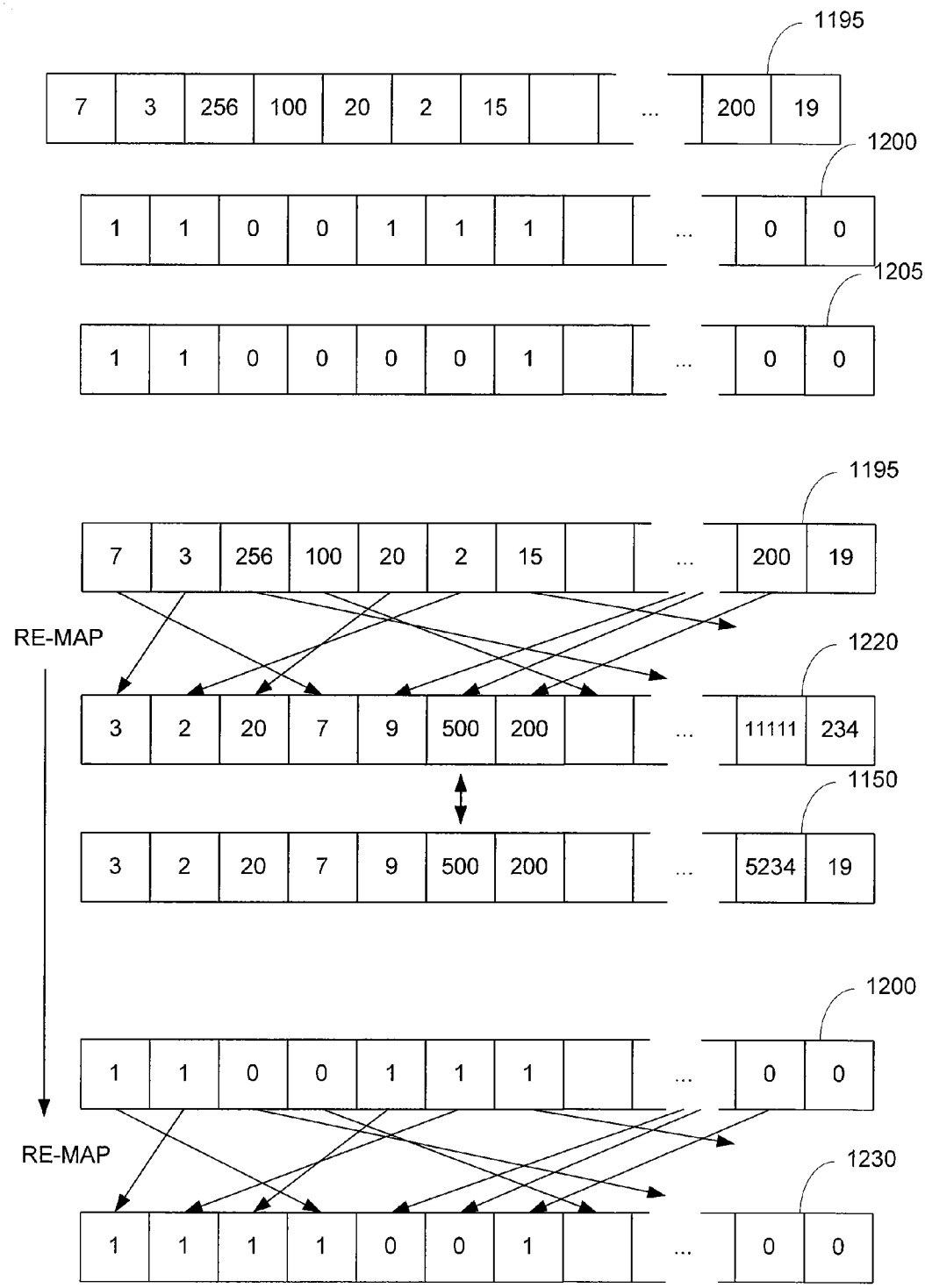

FIG. 20E illustrates an example of process of determining matching themes, as was discussed in step 950. Initially, when an end-user provides an input (phrase, document, or other text) which they want to find documents having a matching theme, the input is processed, as was illustrated above, to determine associated document entry references and associated theme bit maps. More specifically, a synchronic process is performed, diachronic process is performed, and a sealing process is also performed. Then, based upon the entries, a document entry reference is formed 1195, and theme bit maps 1200 and 1205 are determined, for example. In various examples, more than one theme and theme bit map may be determined from the input. For example, in the case of a patent, multiple themes may be extracted. The extracted themes are then compared to the thematic index (e.g. as an input thematic index), as discussed below.

In various embodiments, the document entry reference 1195 and theme bit maps 1200 and 1205 for input are then compared to document entry references and theme bit maps for other documents stored in the thematic index. In the example shown, initially, document entry reference 1195 may be normalized 1220 when comparing it to various document entry references, such as document entry reference 1150. Additionally, the bits in theme bit map 1200, are also normalized 1230 in the same manner.

Figure 20F:
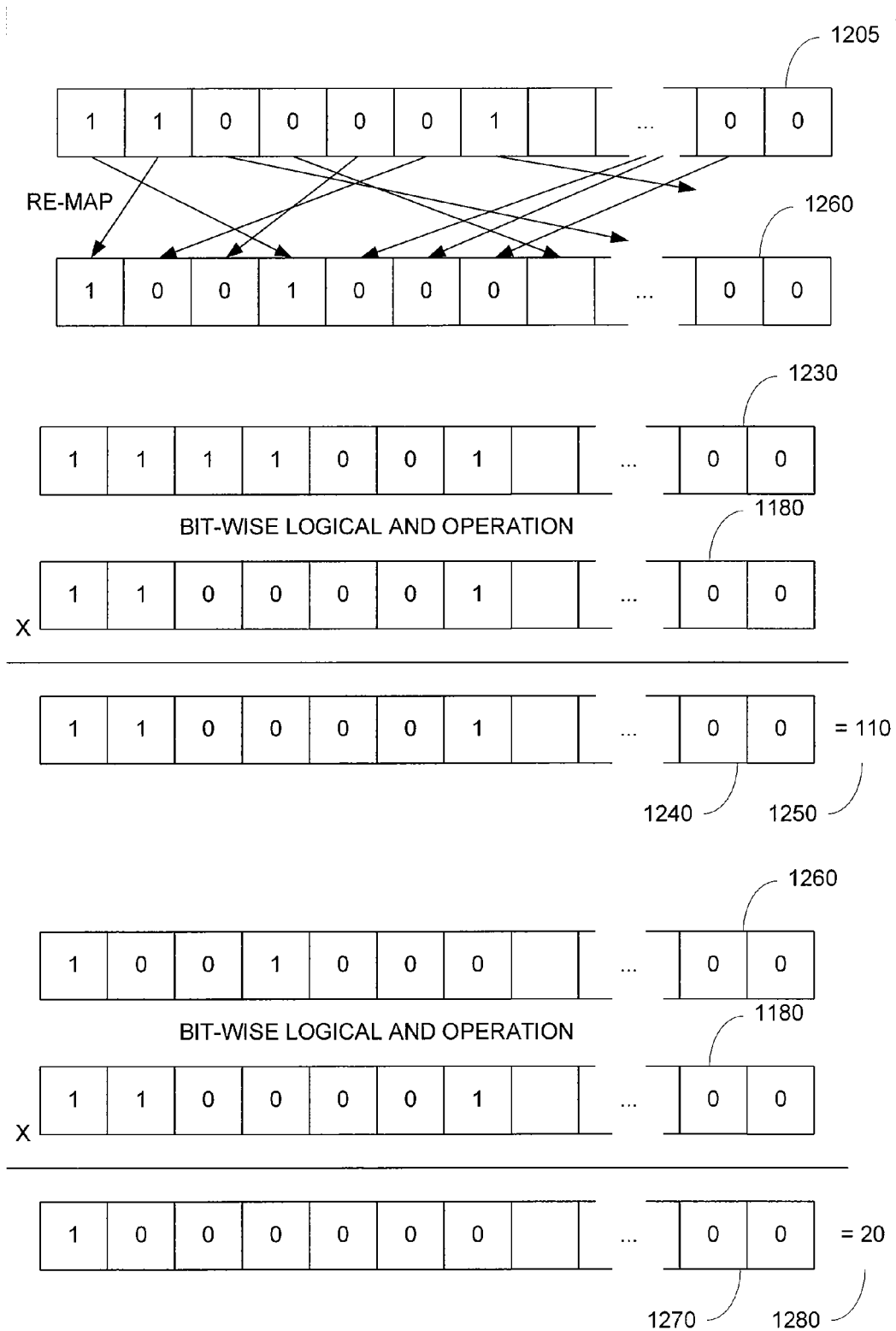

In the example in FIG. 20F, the bits in theme bit map 1205 are also normalized 1260 in a similar way, as shown.

Next, in various embodiments, to determine the "overlap" in themes, theme bit map 1180, for example, may be logically ANDed with normalized theme bit map 1230. The number of "1"s in the result 1240 of the AND operation can then be determined 1250. In various embodiments, as the number of 1's, increases, the themes are considered a better match. In another example, theme bit map 1180 is logically ANDed with normalized bit map theme bit map 1260 to determine a result 1270. Next, the number of "1"s in result 1270 are determined 1280. In some embodiments, the number of "1"s are compared to the number of entries in the input, thus providing a basis for percentage matching. For example, if all entries in document entry reference 1195 are matched, the percentage may be 100%; and if only 10 entries of document entry reference 1195 are matched by a given document, that given document may be said to be a 10% match. In other embodiments, other types of indicators may be output to users to indicate degree of matching. Additionally, in other embodiments, a weighting may be used, such that more important entries have a higher weight. In the example above, theme bit map 1200 would be considered a closer theme to theme bit map 1180 than theme bit map 1205.

In various embodiments, the above processing of the input: normalizing, logical ANDing, summing of matches, etc. may be performed for all documents stored in the thematic index. Then documents having the highest percentage of matching are provided to the user for review, and refinement, as was discussed above. A more detailed block diagram of one embodiment is illustrated in FIG. 21B.

In other embodiments, various ways of reducing the number of documents searched from the thematic index are contemplated. This process may be termed "pre-filtering." In some examples, initial filtering may involve general area of technology. For example, certain entries in idea data structure 1110, clearly relate to different categories, thus, comparisons can be limited to the specific categories. As an example, the term "Trojan horse" is widely used in Biology as a therapeutic method, in Computers as malicious software, in History as a historical event, in Entertainment as a movie, book, and the like. Thus for example, instead of comparing themes of documents in all of these categories, to an input, in various embodiments, the search may be limited to a category desired by the user.

In embodiments of steps 960 and 970, as discussed above, a user may provide feedback as to the relevance of a document she is presented with, via a thumbs-up/thumbs-down type system. In various embodiments, for example, when the user provides a thumbs-up rating, the thematic extraction process described in FIG. 19 is performed with modifications. In one embodiment, the thematic search is performed again, using as input documents, the user's initial input document and the thumbs-up document. By doing this, the extracted theme bit map may be modified, due to the addition of more input data. Accordingly, the modified theme bit map is then applied to the thematic index to identify documents that have themes closely matching the modified theme bit map. Similarly, when a thumbs-down rating is provided, themes extracted from the thumbs-down rating are used as negative input when determining themes from the user's initial input document and the thumbs-down document.

Figure 21C:
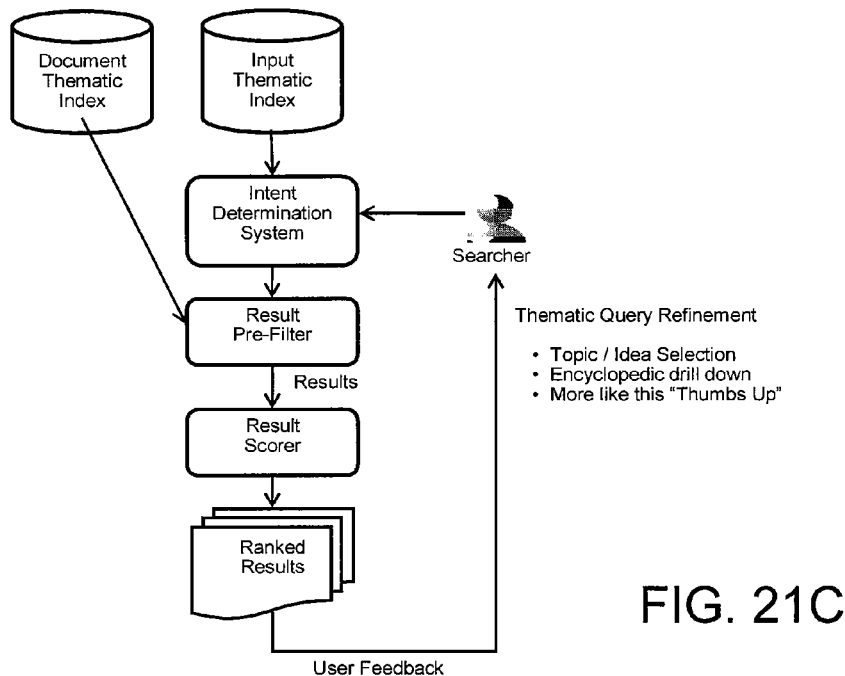

As can be seen, in various embodiments, the thematic searching is performed in real-time, based upon the user's source input (input document), and is again performed in real-time, based upon the user's thumbs-up—type feedback. A more detailed block diagram of one embodiment is illustrated in FIG. 21C.

Figure 22A:
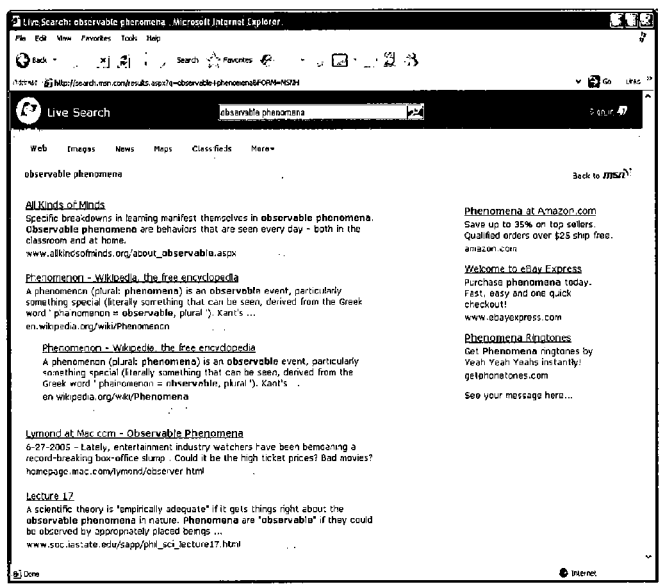
Figure 22F:
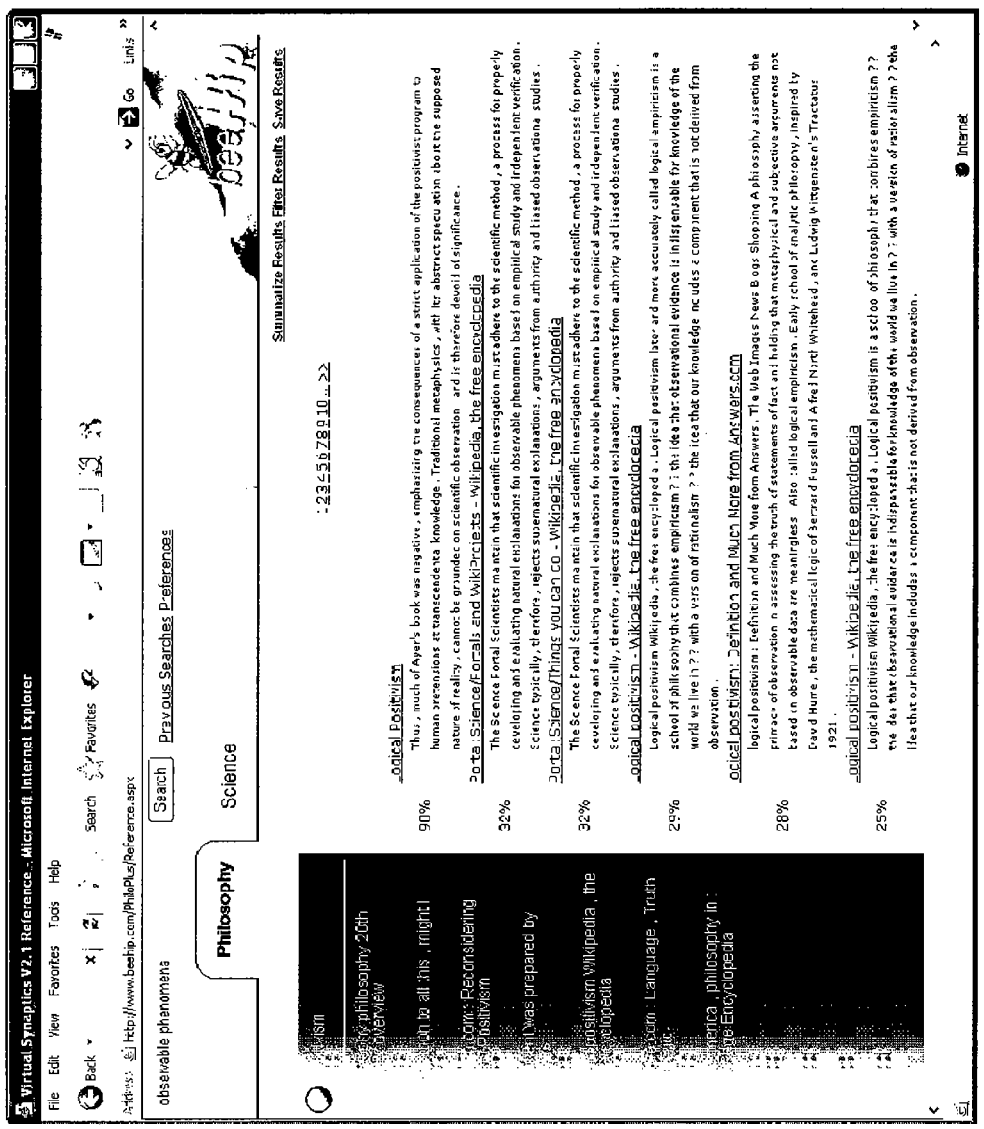

A graphical user interface including such user-selectable categories is illustrated in FIG. 22F. Other types of pre-filtering may be provided to reduce the amount of searching on the thematic index.

FIGS. 22A-F illustrate experimental test results. In FIGS. 22A-E, the term "observable phenomena" (a philosophical term) in the was entered into a plurality of current search engines. In FIG. 22A, as illustrated in this example, individual key word searching often provides nonsensical search results, and importantly, irrelevant advertisements. In FIG. 22B, even though key words may appear in the proper sequence, the "meaning" of the search is not matched. In the example in FIG. 22C, a clustering search site, the user has manually selected the philosophy cluster as being relevant to her search, then she entered "observable phenomena." As can be seen in the search results, again, although key words appear in the proper sequence, the "meaning" of the search is not matched. In the example of FIG. 22E, again, the potential meaning of the phrase is lost. In contrast, with embodiments of the present invention, as illustrated in FIG. 22F, the meaning of the words, together, and in the proper order, are extracted, and matched to themes found in other indexed documents. As illustrated, more than one areas (e.g. philosophy, science) are recognized as being relevant to the phrase. Further, the returned documents are ordered by relevance to the meaning of the user's input.

In other embodiments, combinations or sub-combinations of the above disclosed embodiments can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method comprising:
   receiving, by a computer system, an input source comprising a plurality of sentences;
   determining, by the computer system, a set of semiotic relationships from the plurality of sentences;
   performing, by the computer system, a contextual correlation in response to the set of semiotic relationships and in response to an ideas index to determine a reduced set of semiotic relationships from the set of semiotic relationships;
   comparing, by the computer system, the reduced set of semiotic relationships to each of a plurality of semiotic relationships associated with a set of documents to determine comparison values;
   determining, by the computer system, a reduced set of documents from the set of documents in response to the comparison values; and
   outputting, by the computer system, portions of the reduced set of documents to a user.

2. The method of claim 1 further comprising:
   determining an ordering for the reduced set of documents in response to the comparison values; and
   wherein outputting comprises outputting portions of the reduced set of documents to the user in response to the ordering.

3. The method of claim 1 wherein determining the set of semiotic relationships comprises:
   determining a plurality of signs from the plurality of sentences; and
   determining grammatical relationships for signs in each of the plurality of sentences.

4. The method of claim 3:
   wherein the set of semiotic relationships comprise a set of concepts; and
   wherein the set of concepts comprises signs and respective grammatical relationships for each of the plurality of sentences.

5. The method of claim 4:
   wherein performing the contextual correlation comprises determining a subset of concepts from the set of concepts in response to the ideas index;
   wherein the ideas index comprises an ideas ontology or taxonomy.

6. The method of claim 1 wherein a representation of the reduced set of semiotic relationships comprises a thematic bitmask.

7. The method of claim 6 wherein the representation of the reduced set of semiotic relationships also comprises a data structure identifying association between bits within the thematic bitmask and semiotic relationships from the reduced set of semiotic relationships.

8. A computer system comprising:
   a memory; and
   a processor coupled with the memory, the processor configured to:
      receive an input source comprising a plurality of sentences;
      determine a set of semiotic relationships from the plurality of sentences;
      determine a reduced set of semiotic relationships from the set of semiotic relationships in response to the set of semiotic relationships and in response to an ideas index to determine a reduced set of semiotic relationships from the set of semiotic relationships;
      compare the reduced set of semiotic relationships to each of a plurality of semiotic relationships associated with a set of documents to determine comparison values;
      determine a reduced set of documents from the set of documents in response to the comparison values; and
      cause portions of the reduced set of documents to be output.

9. The computer system of claim 8 wherein the processor is further configured to:
   determine an ordering for the reduced set of documents in response to the comparison values; and
   cause portions of the reduced set of documents to be output in response to the ordering.

10. The computer system of claim 8 wherein the processor is configured to determine a plurality of signs from the plurality of sentences, and to determine grammatical relationships for signs in each of the plurality of sentences.

11. The computer system of claim 10:
    wherein the set of semiotic relationships comprises a set of concepts; and
    wherein the set of concepts comprises signs and respective grammatical relationships for each of the plurality of sentences.

12. The computer system of claim 11:
    wherein the processor is configured to determine a subset of concepts from the set of concepts in response to the ideas index; and
    wherein the ideas index comprises an ideas ontology or taxonomy.

13. The computer system of claim 8 wherein a representation of the reduced set of semiotic relationships comprises a thematic bitmask.

14. The computer system of claim 13 wherein the representation of the reduced set of semiotic relationships also comprises a data structure identifying association between bits within the thematic bitmask and semiotic relationships from the reduced set of semiotic relationships.

15. A non-transitory computer readable storage medium storing code executable by a processor, the code comprising:
    code that directs the processor to receive an input source comprising a plurality of sentences;
    code that directs the processor to determine a set of semiotic relationships from the plurality of sentences;
    code that directs the processor to perform a contextual correlation in response to the set of semiotic relationships and in response to an ideas index to determine a reduced set of semiotic relationships from the set of semiotic relationships;

code that directs the processor to compare the reduced set of semiotic relationships to each of a plurality of semiotic relationships associated with a set of documents to determine comparison values;

code that directs the processor to determine a reduced set of documents from the set of documents in response to the comparison values; and code that directs the processor to output portions of the reduced set of documents to a user.

16. The non-transitory computer readable storage medium of claim 15 further comprising:

code that directs the computer system to determine an ordering for the reduced set of documents in response to the comparison values; and wherein the output portion is configured to output portions of the reduced set of documents to the user in response to the ordering.

17. The non-transitory computer readable storage medium of claim 15 further comprising:

code that directs a processor to determine a plurality of signs from the plurality of sentences;

code that directs the processor to determine grammatical relationships for signs in each of the plurality of sentences;

wherein the set of semiotic relationships comprises a set of concepts; and wherein the set of concepts comprises signs and respective grammatical relationships for each of the plurality of sentences.

18. The non-transitory computer readable storage medium of claim 17:

further comprising code that directs a computer system to determine a subset of concepts from the set of concepts in response to the ideas index;

wherein the ideas index is configured to store ideas ontology or taxonomy.

19. The non-transitory computer readable storage medium of claim 15 wherein a representation of the reduced set of semiotic relationships comprises a thematic bitmask.

20. The non-transitory computer readable storage medium of claim 19 wherein the representation of the reduced set of semiotic relationships also comprises a data structure identifying association between bits within the thematic bitmask and semiotic relationships from the reduced set of semiotic relationships.

* * * * *